United States Patent
Flores Michel et al.

(10) Patent No.: US 11,138,198 B2
(45) Date of Patent: Oct. 5, 2021

(54) HANDLING OF UNRESPONSIVE READ ONLY INSTANCES IN A READER FARM SYSTEM

(71) Applicant: ORACLE INTERNATIONAL CORPORATION, Redwood Shores, CA (US)

(72) Inventors: Francisco Rafael Flores Michel, Jalisco (MX); Andrew Stuart Ingham, Romsey (GB); Wai Shun Wilson Chan, San Francisco, CA (US); Chandrajith Ramachandran Unnithan, Union City, CA (US)

(73) Assignee: Oracle International Corporation, Redwood Shores, CA (US)

(*) Notice: Subject to any disclaimer, the term of this patent is extended or adjusted under 35 U.S.C. 154(b) by 180 days.

(21) Appl. No.: 16/166,008

(22) Filed: Oct. 19, 2018

(65) Prior Publication Data
US 2020/0125665 A1   Apr. 23, 2020

(51) Int. Cl.
*G06F 16/2455* (2019.01)
*G06F 16/28* (2019.01)

(52) U.S. Cl.
CPC ...... *G06F 16/24553* (2019.01); *G06F 16/285* (2019.01)

(58) Field of Classification Search
CPC ............. G06F 16/24553; G06F 16/285; G06F 11/1446
See application file for complete search history.

(56) References Cited

U.S. PATENT DOCUMENTS

| | | | | |
|---|---|---|---|---|
| 8,468,174 B1* | 6/2013 | Yueh | ...................... | G06F 16/128 707/796 |
| 8,763,091 B1* | 6/2014 | Singh | ................... | H04L 63/0884 726/4 |
| 2003/0033344 A1* | 2/2003 | Abbott | .................. | G06F 9/4843 718/1 |
| 2006/0075304 A1* | 4/2006 | Canning | ............... | G06F 11/362 714/38.11 |
| 2015/0254325 A1* | 9/2015 | Stringham | ............ | G06F 16/278 707/737 |
| 2017/0277769 A1* | 9/2017 | Pasupathy | ........... | G06F 16/9027 |
| 2018/0239651 A1* | 8/2018 | Gong | ................... | G06F 11/3423 |
| 2020/0125462 A1 | 4/2020 | Zhu et al. | | |

OTHER PUBLICATIONS

Fan, H., "Aloha-KV: High Performance Read-only and Write-only Distributed Transactions", In Proceedings of SoCC '17, Santa Clara, CA, USA, (Sep. 24-27, 2017).
Goaller, J., "RDBMS in the Cloud: Oracle Database on AWS", Amazon Web Services, (Oct. 2013).

(Continued)

*Primary Examiner* — Ashish Thomas
*Assistant Examiner* — Yohanes D Kelemework
(74) *Attorney, Agent, or Firm* — Vista IP Law Group, LLP

(57) ABSTRACT

Disclosed is a system, method, and computer program product to handle unresponsive reader instances in a database system. A timeout-based invalidation and suspension approach is provided that addresses the problem of unresponsive read-only instances.

24 Claims, 24 Drawing Sheets

(56) References Cited

OTHER PUBLICATIONS

Oracle, "Oracle Active Data Guard Far Sync Zero Data Loss at Any Distance: Oracle Maximum Availability Architecture Best Practices", Oracle White Paper, (Aug. 2014).
Oracle, "Maximize Availability: with Oracle Database 18c", Oracle White Paper, (Feb. 2018).
Ipar, F., "Managing farms of MySQL servers with MySQL Fabric", Percona blog (Apr. 25, 2014).
Ayoub, M., "MySQL read and write separation", Medium, (Jan. 3, 2017).
Zamanian, E., "Rethinking Database High Availability with RDMA Networks", *Proceedings of the VLDB Endowment*, vol. 12, No. 11, (Jul. 2019).
Garcia-Molina, H., "Read-Only Transactions in a Distributed Database", Computer Science Department, Stanford University, (Apr. 1980).
Sybase, "Using Sybase IQ Multiplex: Sybase IQ 15.3", (May 2011).

\* cited by examiner

HANDLING OF UNRESPONSIVE READ ONLY INSTANCES IN A READER FARM SYSTEM

BACKGROUND

A database clustering system allows the underlying servers within a computing infrastructure to communicate with each other, so that they appear to function as a collective unit. Although the servers may be configured as standalone servers, each server has additional processes that communicate with other servers, and the different servers may access a shared/common set of database storage objects. The clustered database system therefore contains a shared architecture in which multiple running instances can each be used to manage a set of shared physical data files. Each of the database instances resides on a separate host and forms its own set of background processes and memory buffers, but in which the cluster infrastructure allows access to a single shared database via the multiple database instances. In this way the separate servers appear as if they are one system to applications and end users.

Some database cluster architectures are configured to include different types of instances to access and manage the data within the database cluster. In particular, a database cluster may include a first type of database instance that is a read-only (RO) instance and a second type of database instance that is a read-write (RW) instance. The read-only instance, as the name suggests, is only permitted to perform read operations upon the data and is not permitted to write to or modify the data within the database. In contrast, the read-write instance is permitted to both read from and write to the database.

There are many reasons to have these different types of database instances. For example, having the different instance types allows a single cluster to be able to handle both OLTP (online transaction processing) and DSS (decision support system) workloads. The computing nodes that host the read-write instances can handle the OLTP workload, which may involve transaction-based updates and modifications to content within the database. The computing nodes that host the read-only instances can handle the DSS workloads, to respond to DSS queries that seeks to read content from within the database, e.g., by using parallel queries executed by distributed workers from among the read-only instances in a reader farm.

Typically, the cluster will include a relatively large number of read-only instances which is combined with a much smaller number of read-write instances. It is for this reason that the smaller number of read-write instances may be hosted by nodes called "hub nodes" and the larger number of read-only instances may be hosted by nodes called "leaf nodes". This type of configuration works well with a workload having a large number of read requests and a much smaller number of write requests The potential issue occurs when a write request is made to modify a resource, and all the read only instances which could be using the same resource need to invalidate their shared access (e.g., shared read locks) to the resource to allow the writer access to the resource. The time taken to do this is dependent on the amount of time every instance takes to invalidate its shared lock and to communicate the completion of this lock release back to the writing instance. This sequence may proceed in a normal processing scenario without any problems, with the write request being fulfilled once lock invalidation is completed on all instances. However, if any of the read only instances become unresponsive during this period of time, then the write request will be delayed. The problem is that this could result in a lengthy delay period where the write request is blocked for that entire length of time. The delay in processing the write request could create significant real-world problems for the organization/enterprise that seeks to perform the write operation, e.g., where commercial transactions in a store or merchant setting are stalled or fail to complete. Another possible solution is to immediately evict (or kill) the unresponsive read-only instance, which would free up the resources to be accessed by the write request. However, there are significant computational costs in evicting the unresponsive read-only instance, such as the loss of work that had already been performed plus any additional costs and delays necessary to restart/reboot the evicted instance and/or to set up the queued workload from that evicted instance to another instance.

What is needed, therefore, is a method and/or system that overcomes these problems, and which provides a more efficient approach to handle unresponsive reader instances in a database system.

SUMMARY

According to some embodiments, a system, method, and computer program product is provided to handle unresponsive reader instances in a database system, where a timeout-based invalidation and suspension approach is provided that addresses the problem of unresponsive read-only instances.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As previously discussed, a problem with known clustering systems having reader farms is the possible occurrence of unresponsive read-only instances. An approach that forces a writer to stay in a waiting state for a resource locked by the unresponsive instance could result in lengthy delays for writer operations that need to update the database. The alternate approach of immediately evicting the unresponsive instance may be overly draconian, given the loss of work that may have already been performed by the killed instance, the additional costs and delays necessary to process the eviction, as well as the fact that immediate eviction of the unresponsive instance does not allow for the possibility that the unresponsive instance may recover on its own.

Some embodiments of the invention provide a more efficient method, system, and computer program product to handle unresponsive reader instances in a database system, where a timeout-based invalidation and suspension approach is provided that addresses the problem of unresponsive read-only instances. In particular, multiple timeout periods are established, with escalating actions taken at each of the different timeout periods. This approach is therefore able to address a read-only instance that fails to acknowledge invalidation in a quick and efficient manner, where an intermediate action is taken to temporarily suspend the unresponsive instance and to allow the writer instance access to the required lock. Any escalation to harsher actions such as eviction occurs only after later timeout periods have expired.

Figure 1:
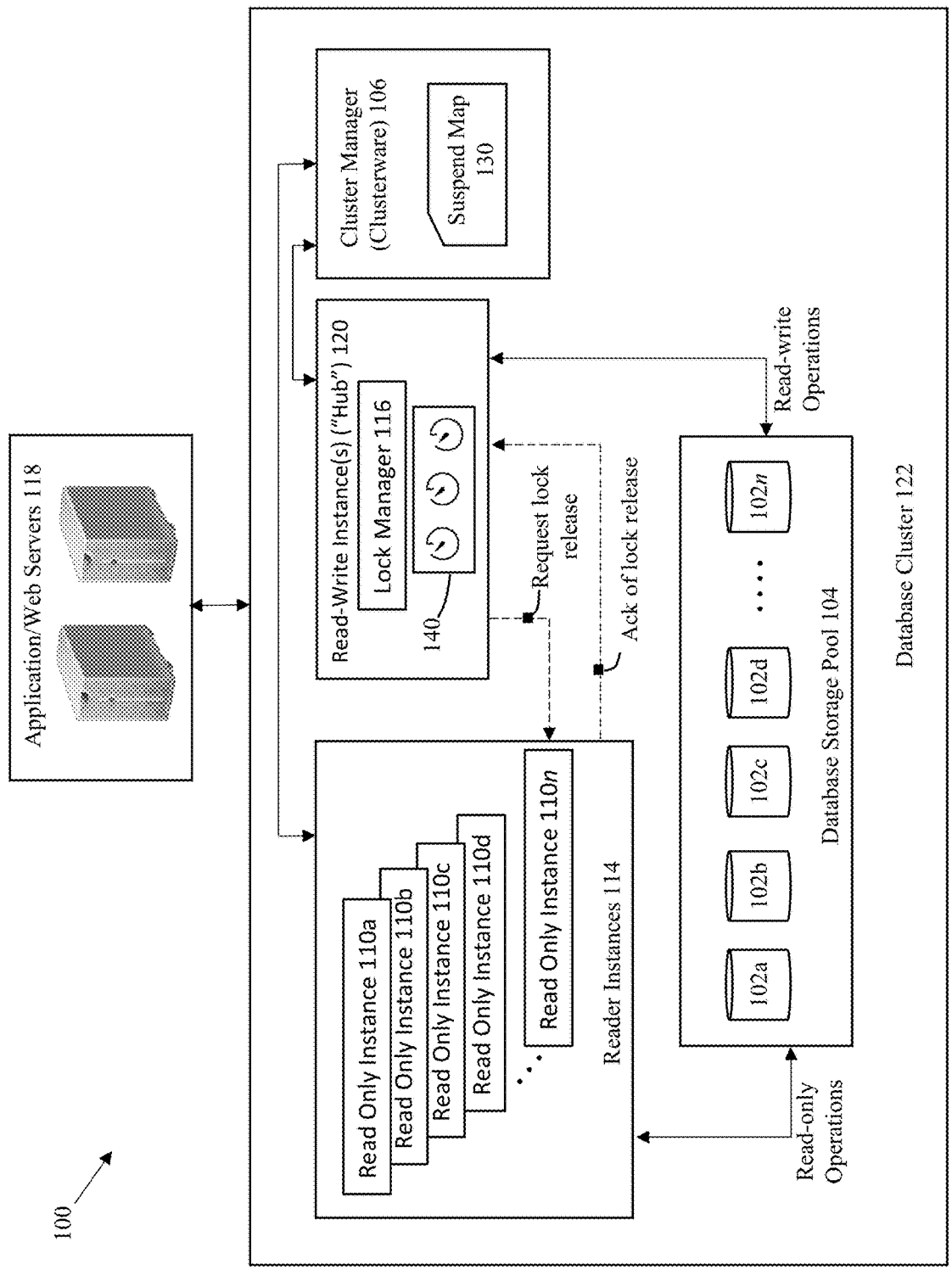
FIG. 1 illustrates a system for implementing some embodiments of the invention.

FIG. 1 shows a system 100 for implementing some embodiments of the invention. A database cluster 122 is provided to handle workloads from one or more clients that seeks to access a database through one or more application/web servers 118. The database cluster includes a database that is stored within multiple storage devices 102a-n within a storage pool 104. The database stored within the storage pool 104 may have one or more tables that are operated upon by the one or more clients, where the clients operate one or more user stations to issue SQL commands to be processed by the database. The user stations and/or the servers within the system 100 comprise any type of computing device that may be used to implement, operate, or interface with the database system. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs.

The database cluster 122 includes multiple interconnected computers or servers that appear as if they are one server to the end users and applications that seek to access the database through the servers 118. There is a one-to-many relationship between the underlying database stored within storage pool and instances. Therefore, the data stored within the storage devices of the storage pool 104 are commonly accessible by any of the nodes/instances that make up the cluster 122.

The cluster 122 includes a relatively small set of read-write instances 120 and a relatively large set of reader instances 114 having a plurality of read-only instances 110a-n. The read-only instances are only permitted to perform reading operations upon the database and are not permitted to write to or modify the data within the database. The read-write instances are permitted to both read from and write to the database.

In general, database applications interact with a database server by submitting commands that cause the database server to perform operations on data stored in a database. For the database server to process the commands, the commands typically conform to a database language supported by the database server. An example of a commonly used database language supported by many database servers is known as the Structured Query Language (SQL). A database "transaction" corresponds to a unit of activity performed at the database that may include any number of different statements or commands for execution. ACID (Atomicity, Consistency, Isolation, Durability) is a set of properties that guarantees that database transactions are processed reliably. Atomicity requires that each transaction is all or nothing; if any part of the transaction fails, then the database state should not be changed by the transaction. Consistency requires that a database remains in a consistent state before and after a transaction. Isolation requires that other operations cannot see the database in an intermediate state caused by the processing of a current transaction that has not yet committed. Durability requires that, once a transaction is committed, the transaction will persist.

When executing operations that modify a database, write-ahead logging is often used to record all modifications performed on the database before they are applied. To ensure ACID properties, no changes are made to the database before the modifications are recorded. Furthermore, no transaction is acknowledged as committed until all the modifications generated by the transaction or depended on by the transaction are recorded. In this manner, write-ahead logging ensures atomicity and durability. The modifications are recorded as change records, which may be referred to herein as "redo" records. When a transaction commits, additional processing steps may be taken to persist the write-ahead logs into some sort of persistent storage, e.g., by writing change records for the transaction from the in-memory log buffers to a persistent storage medium such as hard disk drive (HDD) or to solid state storage (SSD).

The read-write instance 120, since it writes to the database, needs to include processing infrastructure to handle requests to modify the database, including infrastructure to perform write ahead logging and write/persist redo records, as well incurring the computational overhead to perform this type of logging activity for every transaction that modifies the database. In addition, the read-write instance 120 also includes additional infrastructure as well to handle the read and write activities, such as infrastructure to execute DML (data manipulation language) and DDL (data definition language) statements. While the figure shows an illustration having only a single read-write instance 120, it is noted that it is possible for there to be multiple read-write instances in any given database cluster system.

Unlike the read-write instance 120, the read-only instances 110a-n only handle read operations and do not need to execute any write operations. As a result, the read-only instances can be optimized and configured for more efficient read operations, since these instances do not need to include any of the infrastructure or incur the cost that would be otherwise be necessary if they also handled write operations. For example, the read instances do not need to generate redo records (since they do not modify the database), do not need infrastructure to handle DDL and DML statements, and do not need to handle activities such as delayed block clean-outs. It is for this reason that reader farms include a significant number of read-only instances, since the operation of these read-only instances can be managed very efficiently to handle large numbers of database requests that only need to have read-access to the database.

However, both the read-only instances and the read-write instances do access the same set of shared underlying content within the database. As a result, a synchronization mechanism is usually provided to prevent conflicts when the multiple instances seek to access the same set of shared resources. Lock management is a common approach that is used to synchronize accesses to the shared resources. A resource corresponds to any object or entity to which shared access must be controlled. For example, the resource can be a file, a record, an area of shared memory, a database row/column, or anything else that can be shared by multiple entities in a system. An entity can acquire locks on the database as a whole, or on particular parts of the database. There are several possible approaches that can be taken to implement a lock management system. One common approach is to use a centralized lock management (CLM) service in which the locks are managed in a centralized location. The enqueues of the lock requests are centrally managed in a dedicated database (DB) component. When an instance seeks access to a given resource, the instance sends a request to the centralized lock management component to obtain a lock on the resource. Another possibility is to use a Distributed Lock Management (DLM) approach, which permits multiple database instances to access the same database files simultaneously, where communications between the instances are managed by the Distributed Lock Manager (DLM). To address the possibility of two or more instances attempting to modify the same information simultaneously, the DLM uses multiple distributed processes to lock the resources in use by these instances, e.g., where a first RW instance has a DLM that manages locks for a first database object and a second RW instance has a DLM that manages locks for a second database object. For purposes of illustration only, the following embodiment employs a distributed lock manager 116 to manage locks, but it is noted that the invention is not limited to a DLM, and indeed, may be usefully applied to a system having any type of lock management scheme.

When any of the read-only instances 110 or the read-write instances 120 seek to access data within the database, a lock may need to be acquired using the lock management system to avoid inconsistent access to that data. There are many types of locks that may potentially be taken on the data. For example, the exclusive (EX or X) lock is a lock that can be held by only a single entity, which allows read and update access to the resource while preventing others from having any access to that locked resource. A shared (S) lock can be held by multiple entities at the same time, which allows an entity holding the lock to read the resource while preventing other entities from updating that resource.

For a given resource, one or more read-only instances 110 may have acquired a lock (e.g., a shared read lock) on a resource, due to read requests that have been sent to one or more read-only instances 110 with regards to that resource. However, assume that a subsequent write request needs to be processed by a read-write instance 120 on that same resource. To perform the write request, the read-write instance 120 needs to obtain another lock (e.g., an exclusive lock) on that resource. The read-write instance 120 will be unable to obtain the exclusive lock if any valid shared locks are already being held by any of the read-only instances 110. Therefore, an invalidation message will be sent to each of the read-only instances 110 that currently hold a lock on the resource which instructs them to release their lock on that resource. When the read-only instance 110 receives that instruction message from a lock manager (e.g., the distributed lock manager 116 on the read-write instance 120), the read-only instance should release its lock, and send an acknowledgment message for the lock release back to the lock manager 116. To avoid conflicting and inconsistent access to the resource, the lock manager 116 should not be granting any exclusive locks to a resource until all instances that currently hold a conflicting lock (e.g., the shared lock held by read-only instances) have been released.

The potential problem that arises is where the instruction message to release the shared lock is sent to the relevant read-only instances, but one or more read-only instances fail to respond back with the appropriate acknowledgement message indicating that its lock has been released. This could be due to any number of reasons. The problem could be as severe as a catastrophic failure of the entire read-only instance 110 and/or the computing node that hosts that instance. On the other end of the spectrum, the problem could be as minor as a lengthy networking queue that only temporarily stalls the delivery of the acknowledgement message to the read-write instance 120. However, there is often no way for the read-write node 120 to know the severity of the problem—it just knows that the write request needs to be delayed until the exclusive lock can be granted to that resource. If the read-write instance just simply waits for the acknowledgment message, then an indefinitely long delay period may occur before it is able to execute the write request, especially for severe problems that may have occurred at the nonresponsive RO instance. On the other hand, if the read-write node chooses to immediately evict or kill the non-responsive read-only instance, then this solution may be too extreme if the non-responsiveness by the read-only instance is only transitory.

This problem is addressed in some embodiments of the invention by implementing multiple time-out periods using a plurality of timers 140. Each invalidation request results in timers that elapse for each of the read-only instances that are asked to invalidate a lock. Escalating actions can then be taken at the expiration of the different timeout periods.

One of the inventive actions that is taken in some embodiments is to introduce a suspended state on a read-only instance, in which current transactions can finish performing their jobs but new jobs are not allowed to start while the instance is in the suspended state. When a transaction wishes to obtain an exclusive lock, the appropriate request should go to a read-write instance, which then notifies every read-only instance that could be reading that block to stop reading it. Only after every read-only instance invalidates their shared locks, can the exclusive lock then can be granted. In conventional systems, if reader node fails to respond on time (e.g., due to communication issues), then the exclusive lock cannot be granted. The suspended state of the present embodiment is able to resolve this problem, where when a transaction wishes to obtain an exclusive lock on a read-write node, it will notify read-only nodes to invalidate shared read locks; however, if a communications problem occurs and acknowledgements of the invalidation are not received back, then after a certain time period, the exclusive lock will be granted anyway, putting the read-only node in a suspended state, where it can finish current transactions, but not allowing new ones to begin.

To accomplish this, a notification mechanism is specified that will allow both read-only instances and read-write instances to know which instances have been placed into a suspended state, even if there is no direct communication between the RO instance and the RW instance. In some embodiments, a suspend map is employed as this notification mechanism. The cluster management software which has a distributed component loaded onto every node can be employed to maintain a map of all suspended read-only instances, which is available to/from all nodes. Even in the presence of a communications problem, the suspend map may be accessed by a node in a cluster through an alternate channel (e.g., a storage channel as described in U.S. patent application Ser. No. 16/165,314, filed on even date herewith, which is hereby incorporated by reference in its entirety). Every time a new exclusive lock is requested, an invalidation procedure will attempt to handle the request, asking every read-only instance that has the pertinent block on their caches to stop using it. If a read-only instance does not acknowledge back in a given timeframe (e.g., X ms), then the read-write instance will mark that non-responsive instance as suspended in the suspend map and will wait an additional time period (e.g., Y ms). After this additional time, the read-write instance can then grant the exclusive lock. Every read-only instance is configured to periodically check the suspend map (e.g., every Y ms), to guarantee they are not suspended. If a given instance/node is marked as being suspended, or if the node/instance is unable to check the suspend map within a required periodic time frame, then that instance will be configured to not accept new requests.

By using this communications mechanism, the inventive approach can be sure that the suspend map is available to all instances, and make the updates to the map scalable. If any instance fails to communicate with this mechanism, then it will be evicted after a designated period of time.

Figure 2:
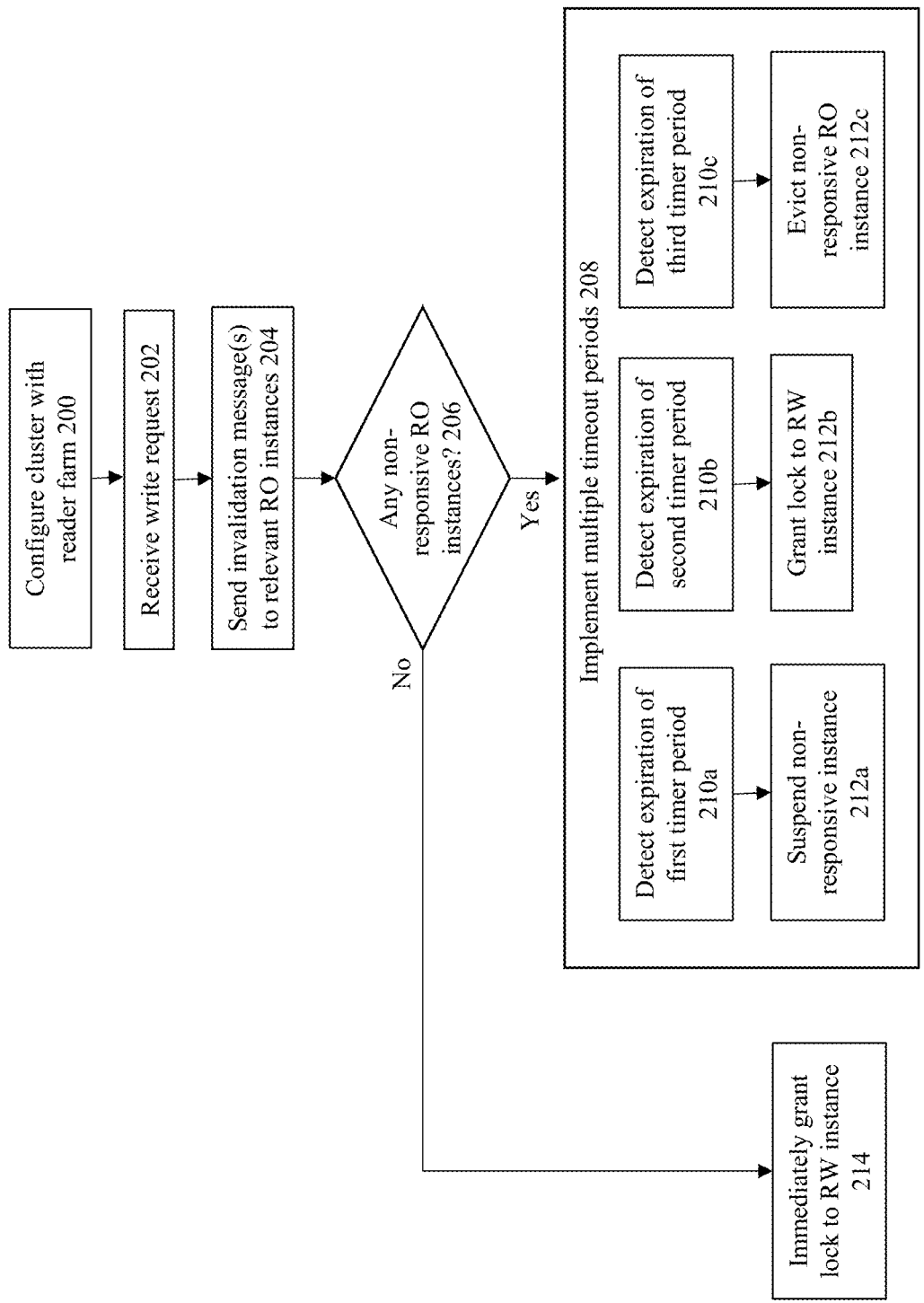
FIG. 2 shows a flowchart of an approach to implement multiple time-out periods using a plurality of timers according to some embodiments of the invention.

FIG. 2 shows a flowchart of an approach to implement multiple time-out periods using a plurality of timers (and/or a single timer having multiple timer periods) according to some embodiments of the invention. At 200, a database cluster is configured to include a reader farm, e.g., as illustrated in FIG. 1 where the cluster includes both read-only instances 110 and read-write instances 120.

At step 202, a write request is received for processing. The write request could be issued, for example, based upon a DML, statement that seeks to modify some or all of a relational database table within the database managed by the cluster 122. The request is handled by one of the read-write instances 120 within the cluster 122 (and not one of the read-only instances 110), since only a read-write instance 120 is capable of executing write operations in the cluster 122.

To handle the write request, the read-write instance 120 will need to obtain an appropriate lock on the resource being modified. Therefore, to the extent there are any read-only instances 110 that are currently holding a lock on that resource, at step 204 an invalidation message will be sent to those read-only instances 110 to release any such locks.

A determination is made at 206 whether there are any read-only instances that have failed to provide an acknowledgement that its lock has been released. If all required acknowledgements have been received, then at 214, the read-write instance 120 is permitted to acquire its lock. At this point, the read-write instance 120 can proceed to execute the required write operation upon the resource.

However, it may be determined at 206 that one or more of the read-only instances 110 did not respond with the appropriate acknowledgement message. At 208, multiple timeout periods may be implemented to address the non-responsive read-only instances 110.

For example, at 210a, a first timeout period may be implemented for a first stage of processing for non-responsive instances. Expiration of a first time-out period can be addressed, at step 212a, by placing the non-responsive read-only instance into a suspended state. A suspended state for a read-only instance 110 will not allow that instance to handle any new work that is sent to that instance. This suspended state can be implemented by writing an entry into a map of all suspended instances (suspend map 130). The suspend map 130 can be managed by cluster management component 106 that interfaces with all read-only instances 110 and all read-write instances 120 within the cluster 122. The cluster manager (also referred to herein as "clusterware") will inform all instances of the current status of any instances that are currently in suspension. In addition, each read-only instance is configured so that it will not accept new work before checking to make sure it is not on the suspend map list (e.g., periodically or on an as-needed basis).

At 210b, a second timeout period may be implemented for a second stage of processing for non-responsive instances. At 212b, expiration of a second time-out period can be addressed by allowing the read-write instance 120 to obtain an appropriate lock (e.g., exclusive lock) on the requesting resource. This permits the read-write instance 120 to then perform the requested write operations upon the resource.

At step 210c, a third timeout period may be implemented for a third stage of processing for non-responsive instances. Expiration of a third time-out period can be addressed, at 212c, by evicting the nonresponsive read-only instance. Eviction is the process of removing a node/instance from the database cluster. This is normally a computationally expensive process since the cluster manager component will engage in operations to clean up the failed node/instance, as well as the costs and latency involved in restarting various services on the node and/or rebooting the entire node. In addition, since the nonresponsive instance may have been currently engaged in a long-running query/operation, eviction of that instance will result in loss of the time and resources that have already been invested in that request being processed by the instance.

It is noted that the different timeout periods can be selected having particular time lengths to further the specific results sought to be achieved to address the non-responsive instances. In some embodiments, the first and second timeout periods correspond to relatively short time periods (e.g., 5 ms), while the third timeout period is a longer timeframe (e.g., 5 minutes). This example approach allows for a fast and immediate response to detection of non-responsive instances (e.g., suspend and grant of lock to writer instance after the fast first and second timeout periods, respectively), while providing for implementation of more severe and draconian actions after a longer delay period (e.g., eviction after the longer third timeout period).

This approach is therefore able to address a read-only instance that fails to acknowledge invalidation in a quick and efficient manner, with the harsher choice of eviction taken only after other less-extreme actions have already been implemented.

It is noted that various permutations of the different timeout periods may be configured for certain embodiments. For example, an alternate embodiment may be configured such that both the suspend state and the grant of the RW lock occur after a single, common timeout period. Another embodiment may have two separate timeout periods for the suspend state and the grant of the RW lock as shown in the figure, but unlike the approach described above where both timeout periods have the same 5 ms timeframe, this alternate embodiment has different timeframes for each timeout period (e.g., one timeout period is 5 ms and the other timeout period of more or less than 5 ms).

Figure 3:
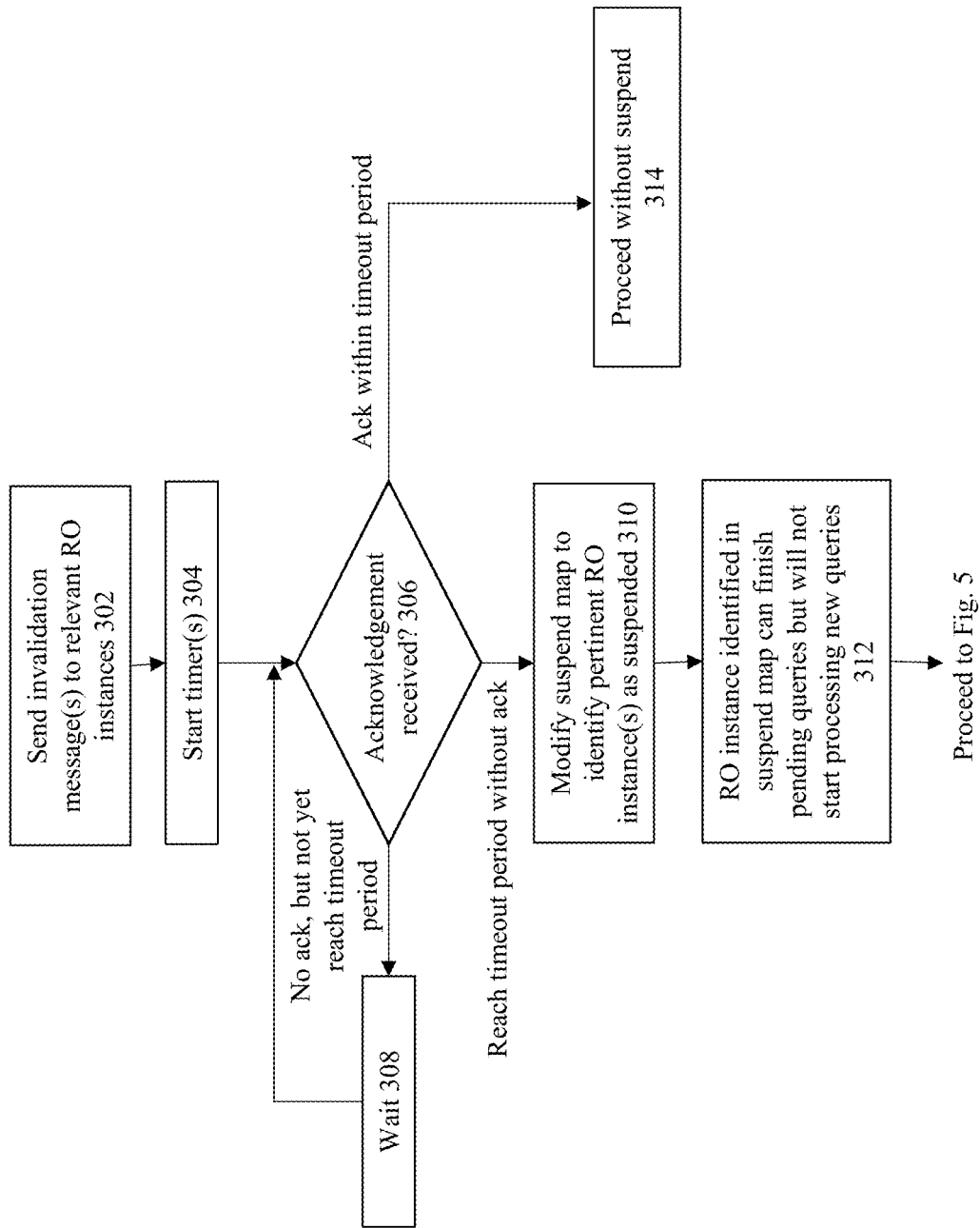
FIG. 3 shows a more detailed flowchart of an approach to implement the first timeout period of the inventive approach according to some embodiments.

FIG. 3 shows a more detailed flowchart of an approach to implement the first timeout period of the inventive approach according to some embodiments. At 302, an invalidation message is sent to all relevant read-only instances. The relevant read-only instances correspond to the read-only instances which are currently holding a lock on a resource that is incompatible with a requested lock by the read-write instance. For example, any read-only instance that is currently engaged in processing a query to access a given row within a database table may have acquired a shared read lock on the database block associated with that row of data, and will likely have a copy of that block in its memory cache for its execution of the query against that data. If a read-write instance seeks to update that same database row, then it will need to obtain an appropriate lock to perform the update operation, e.g., by obtaining an exclusive lock. The shared read block held by the read-only instance is incompatible with the exclusive lock sought by the read-write instance, and hence an instruction will be sent to the read-only instance in this situation to invalidate its shared read lock.

At 304, a timer is started for this first timeout period. The timer is tracked for each of the read-only instances that have been instructed to invalidate the lock currently being held by that instance for the specified resource. A determination is made at 306 whether the first timeout period has been reached and whether the requested acknowledgement has been received for release of the lock. If the appropriate acknowledgement has been received within the timeout period, then processing proceeds at 314 without entering a suspend state. If the appropriate acknowledgement has not been received, but the timeout period has not yet expired, then after a wait period at 308, the determination is made again.

If the threshold of the first timeout period has been reached without the appropriate acknowledgement, then at 310, the suspend map is marked to identify the pertinent read-only instance(s) that should be suspended. As noted in step 312, the instance that is identified in the suspend map is permitted to finish any pending queries, but is prohibited from processing any new queries.

Figure 4A:
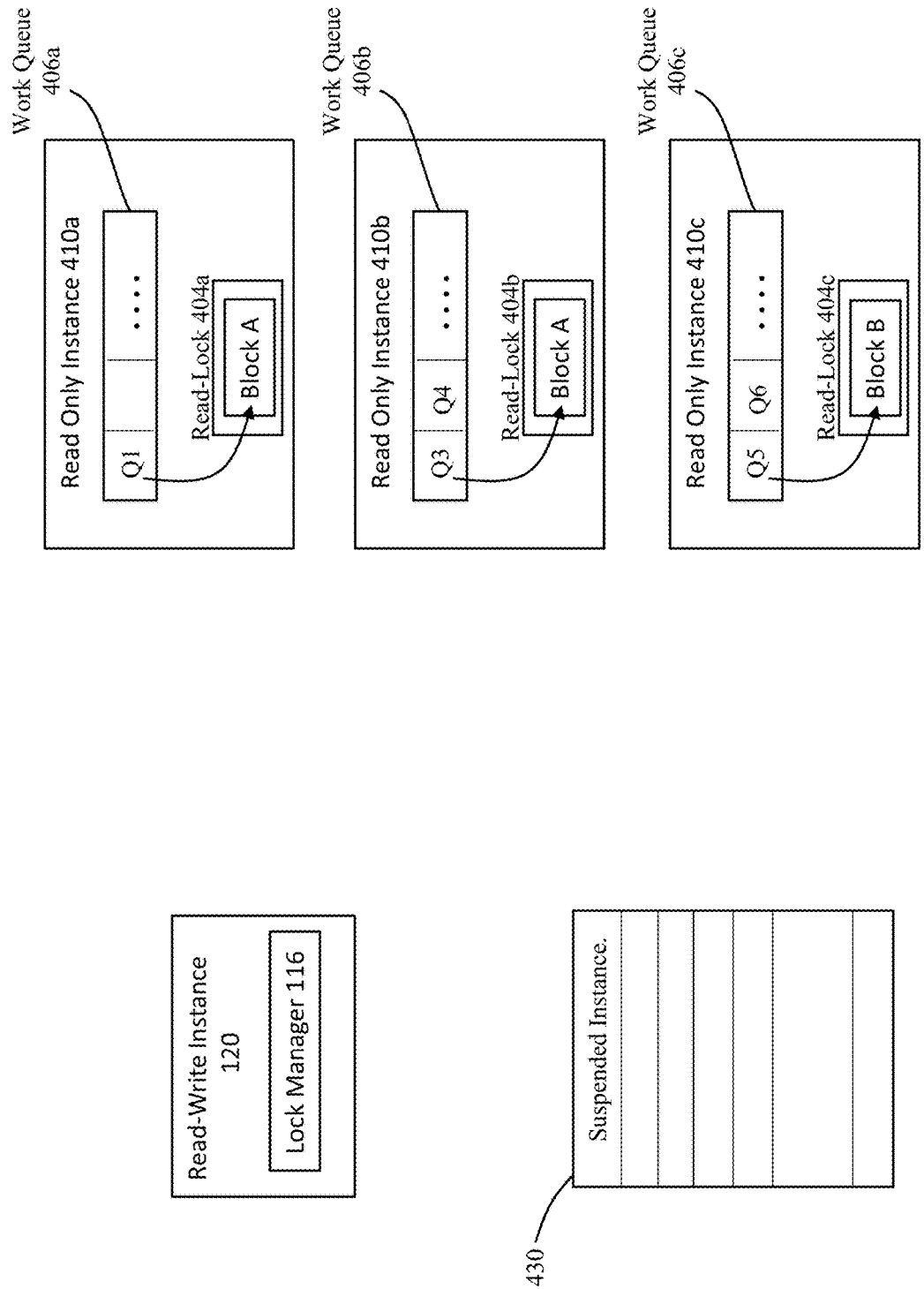
FIGS. 4A-4G illustrate an approach to implement the first timeout period according to some embodiments.

FIGS. 4A-G illustrate this process flow. FIG. 4A shows a read-write instance 120 and three separate read-only instances 410a, 410b, and 410c within an example cluster. As shown in this figure, RO instances 410a and 410b are currently holding read locks on the same block (Block A), where RO instance 410a holds lock 404a and RO instance 410b hold lock 404b. RO instance 410c hold a read lock 404c on a different block (Block B). At the current time, the suspend map 430 does not identify any read-only instances as being suspended.

Figure 4B:
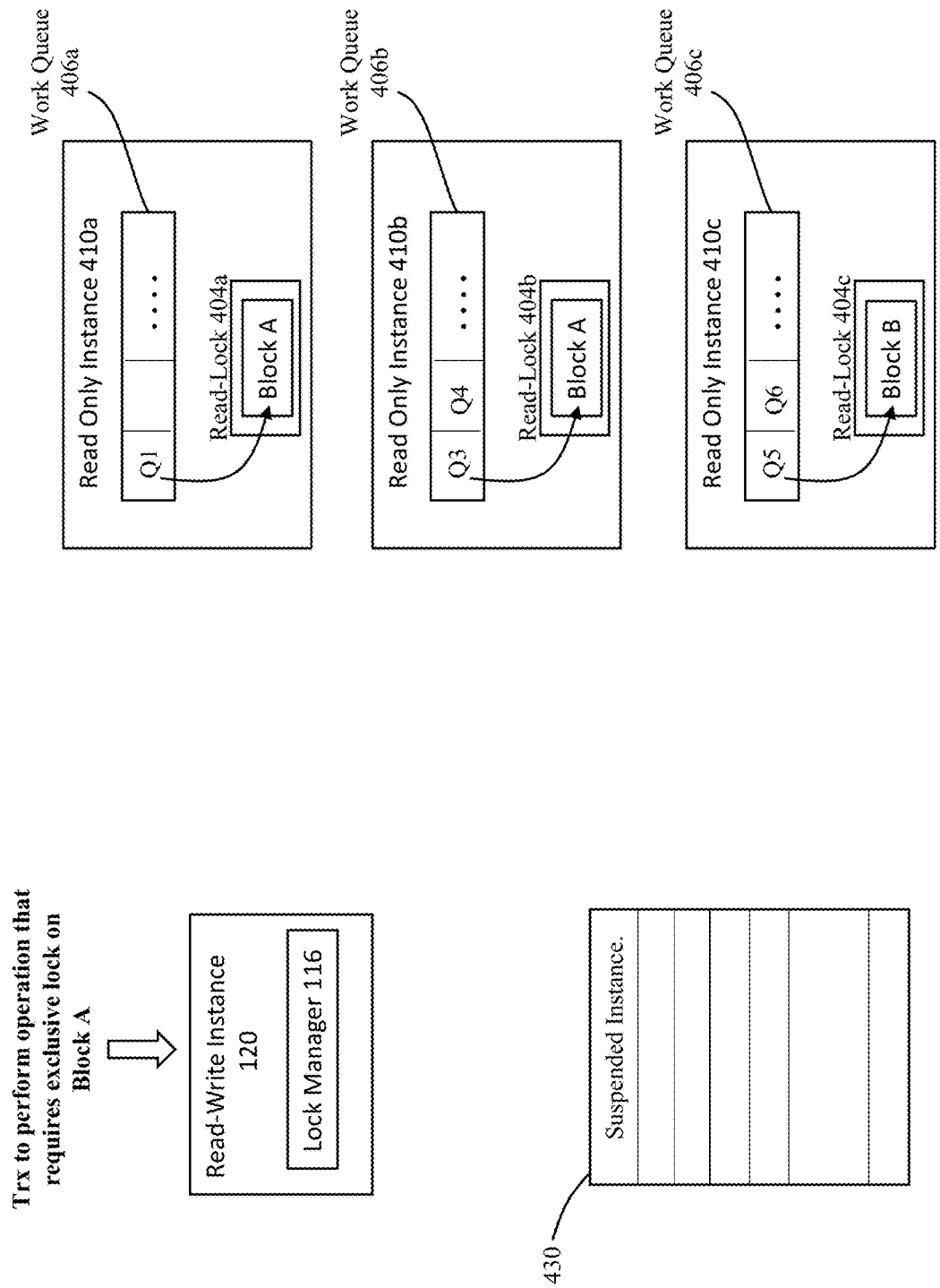

As shown in FIG. 4B, a transaction is subsequently processed by the RW instance 120, where the transaction needs to make a change to the contents within Block A. As a result, the RW instance 120 will need to obtain an exclusive lock on Block A. However, as was previously discussed, a shared read lock on Block A is currently being held by both RO instance 410a and RO instance 410b.

Figure 4C:
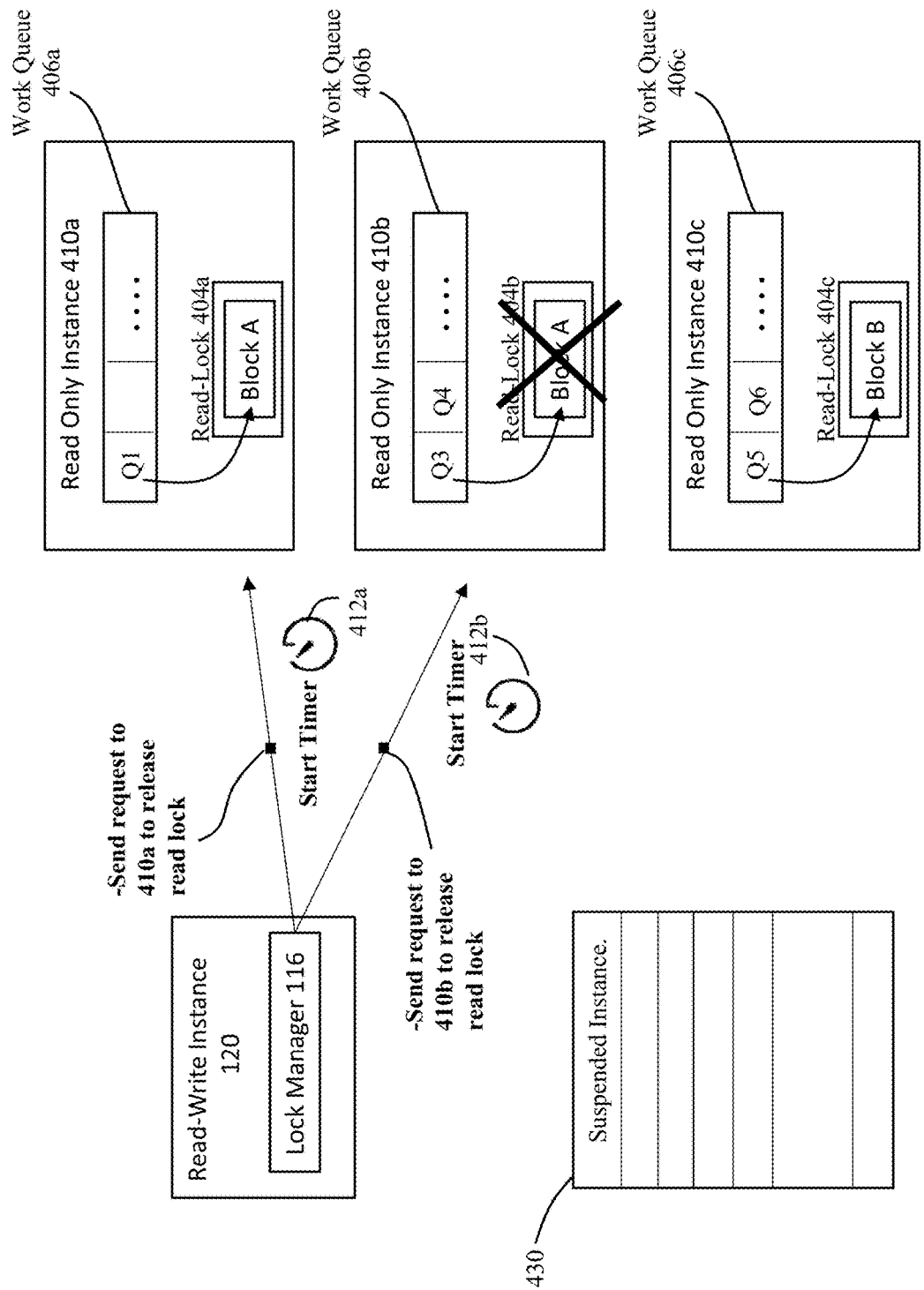

Therefore, as shown in FIG. 4C, a request is sent to both RO instance 410a and RO instance 410b to invalidate and release their locks 404a and 404b, respectively, on Block A. A timer 412a is started with regards to the invalidation request sent to RO instance 410a, and a timer 412b is started with regards to the invalidation request sent to RO instance 410b.

Figure 4D:
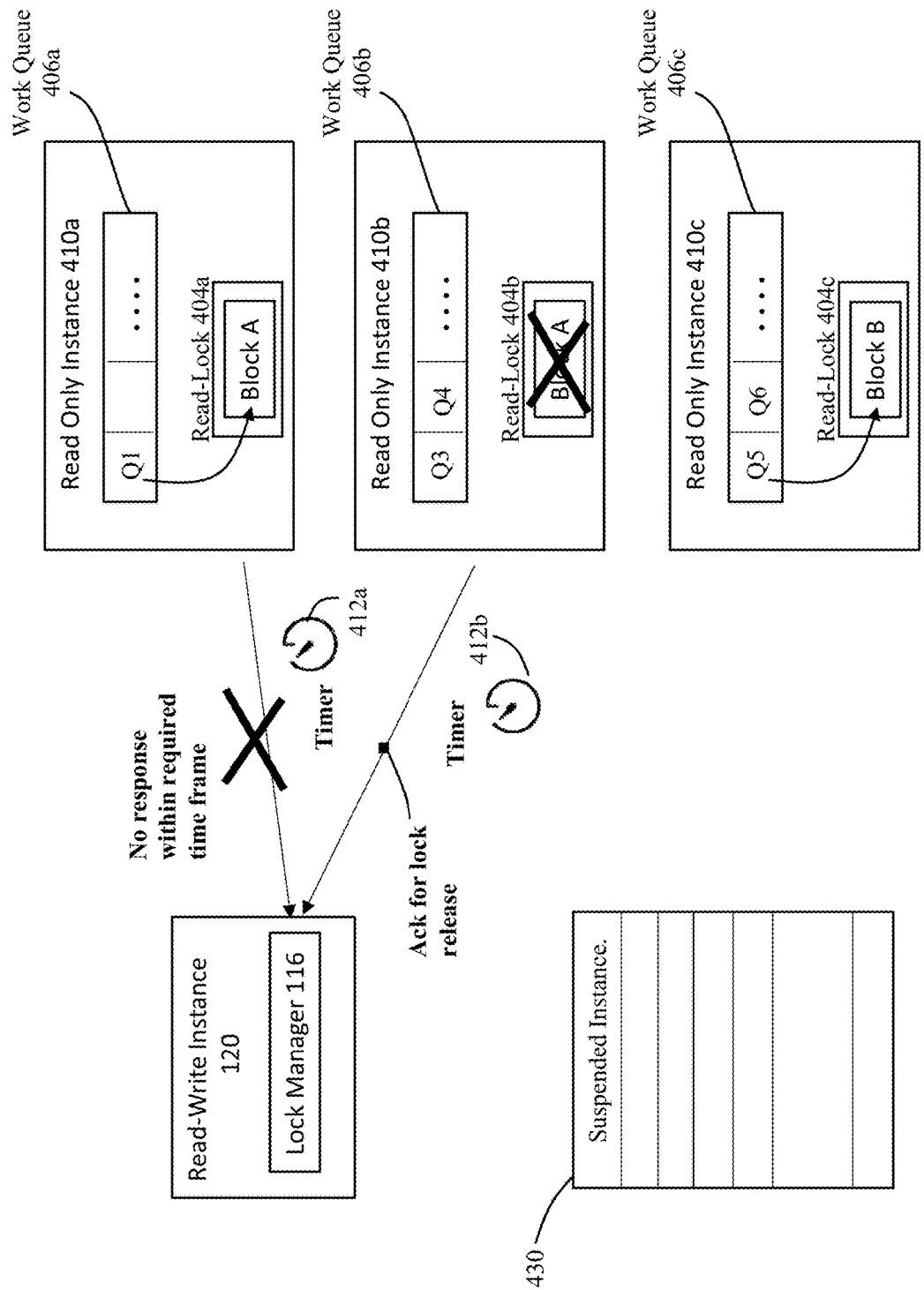

FIG. 4D shows the situation where at least one read-only instance does not immediately respond back with an acknowledgement of its lock release. In particular, while RO instance 410b does send back an acknowledgment message indicating that this instance 410b has invalidated its lock 404b on Block A, this acknowledgment message was not received at the RW instance 120 from RO instance 410a within the first timeout period.

Figure 4E:
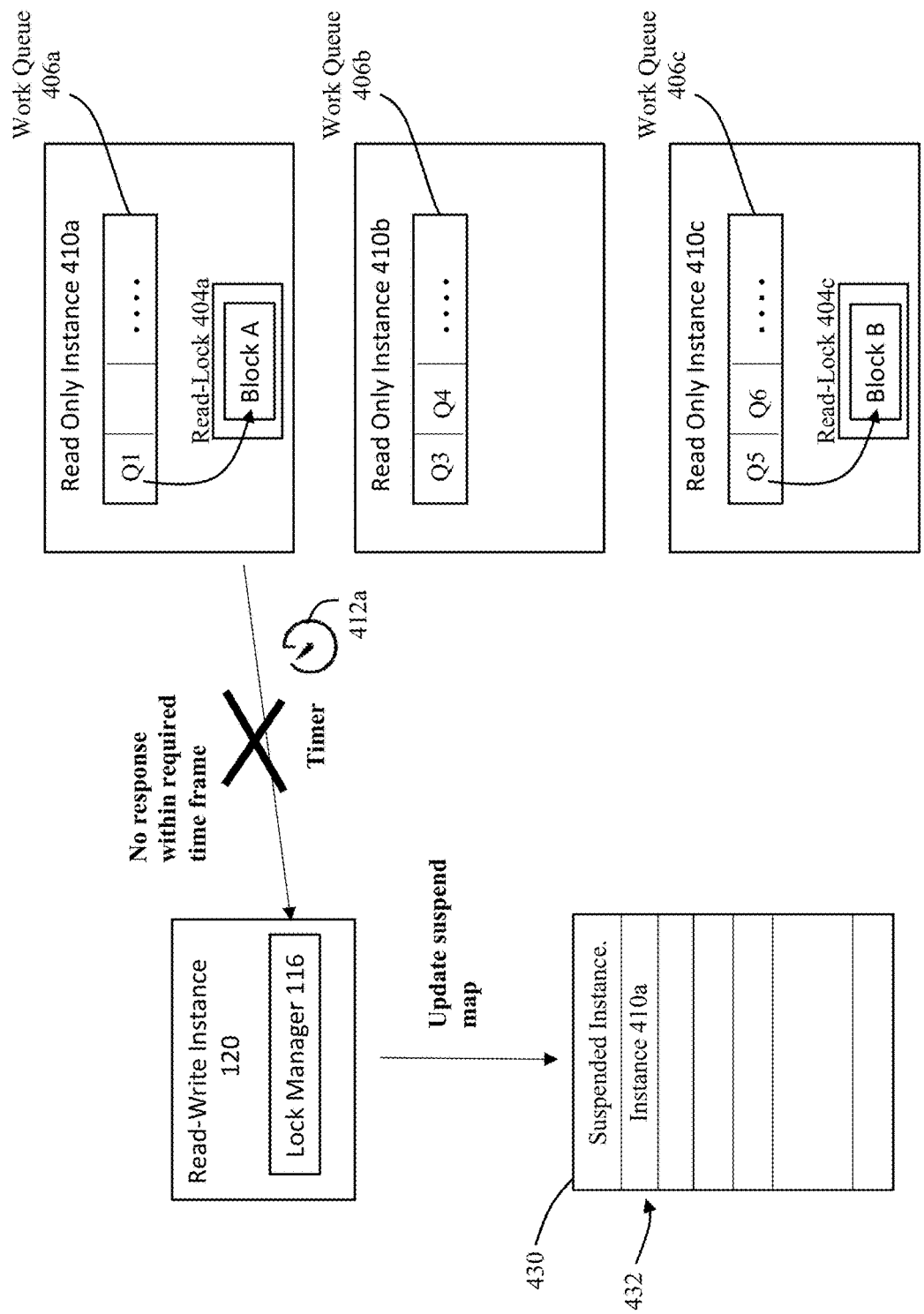
Figure 4F:
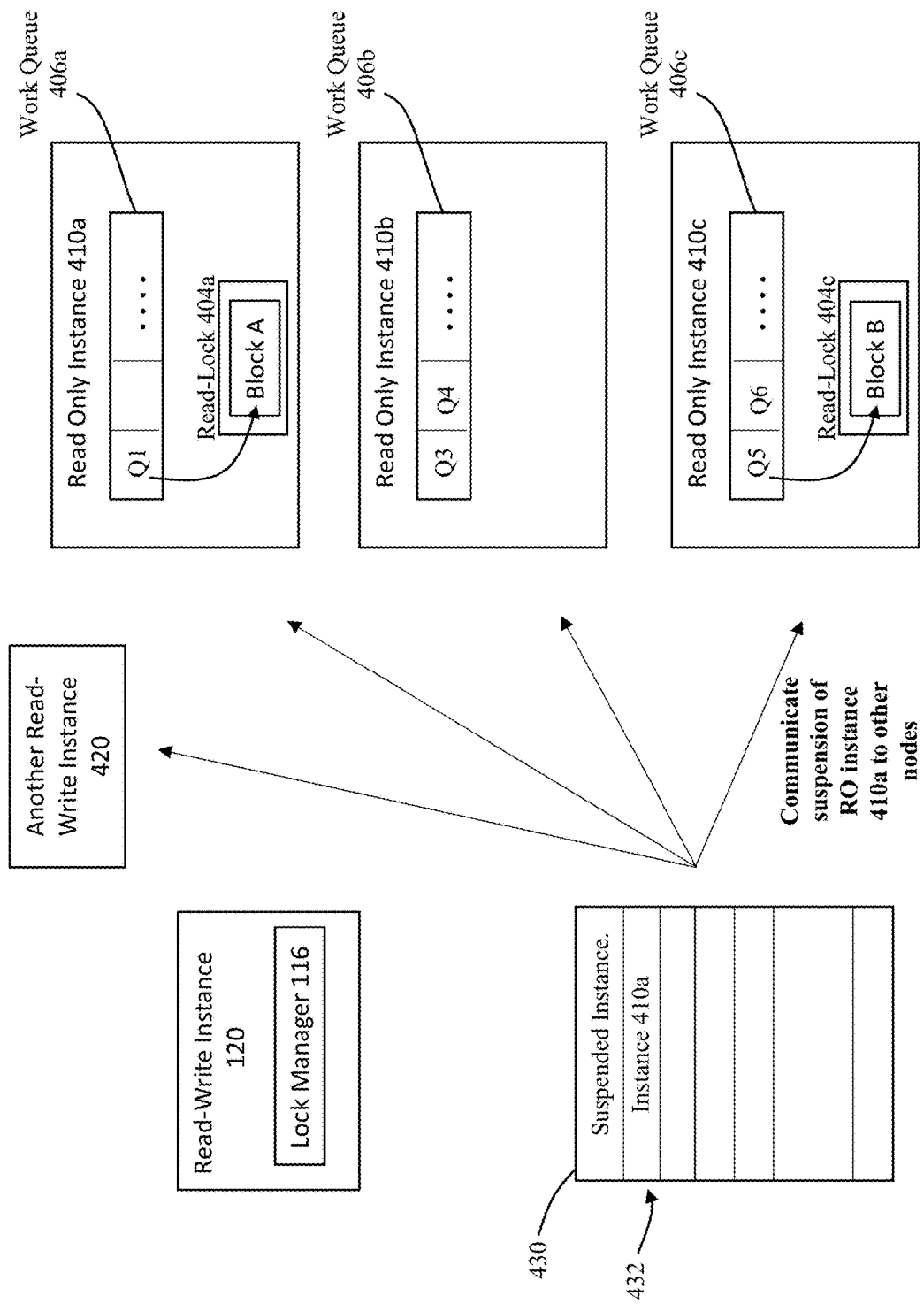

As such, as shown in FIG. 4E, the suspend map 430 is updated to include an entry 432 that identifies RO instance 410a as a suspended instance. As shown in FIG. 4F, the suspension of RO instance 410a is communicated to other nodes within the system (e.g., where (a) a message is broadcasted and/or (b) each instance identifies suspensions without a broadcast message by periodically checking the suspend map). In particular, since multiple read-write instances commonly access the same suspend map in some embodiments, this means that other read-write instances 420 will also know about the fact that RO instance 410a has been suspended. The other read-only instances are also notified of the suspension of RO instance 410a.

Figure 4G:
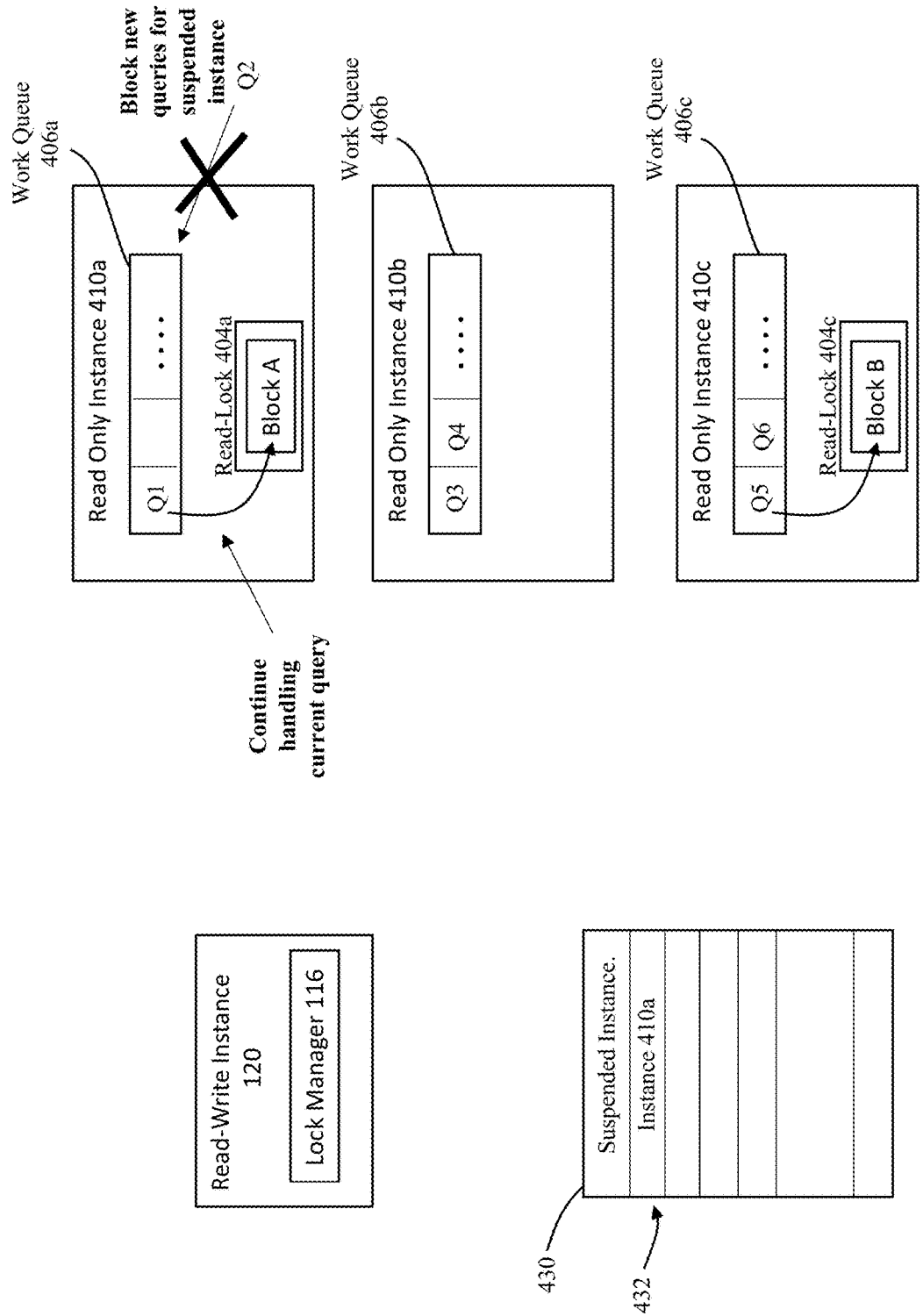

As shown in FIG. 4G, the suspended RO instance 410a can continue to process the query Q1 that it was already processing at the time of the suspension. This is because, for consistency purposes, query Q1 was started at an earlier point in time when the block loaded into its cache was correct, and therefore it can continue to finish processing with the understanding that the query results will still be correct for that earlier time period. However, any new queries (e.g., Q2) will be blocked from being processed by the suspended RO instance 410a. This suspension of the RO instance 410a therefore creates a temporary "pause" on any new requests that can be handled by the suspended instance.

Figure 5:
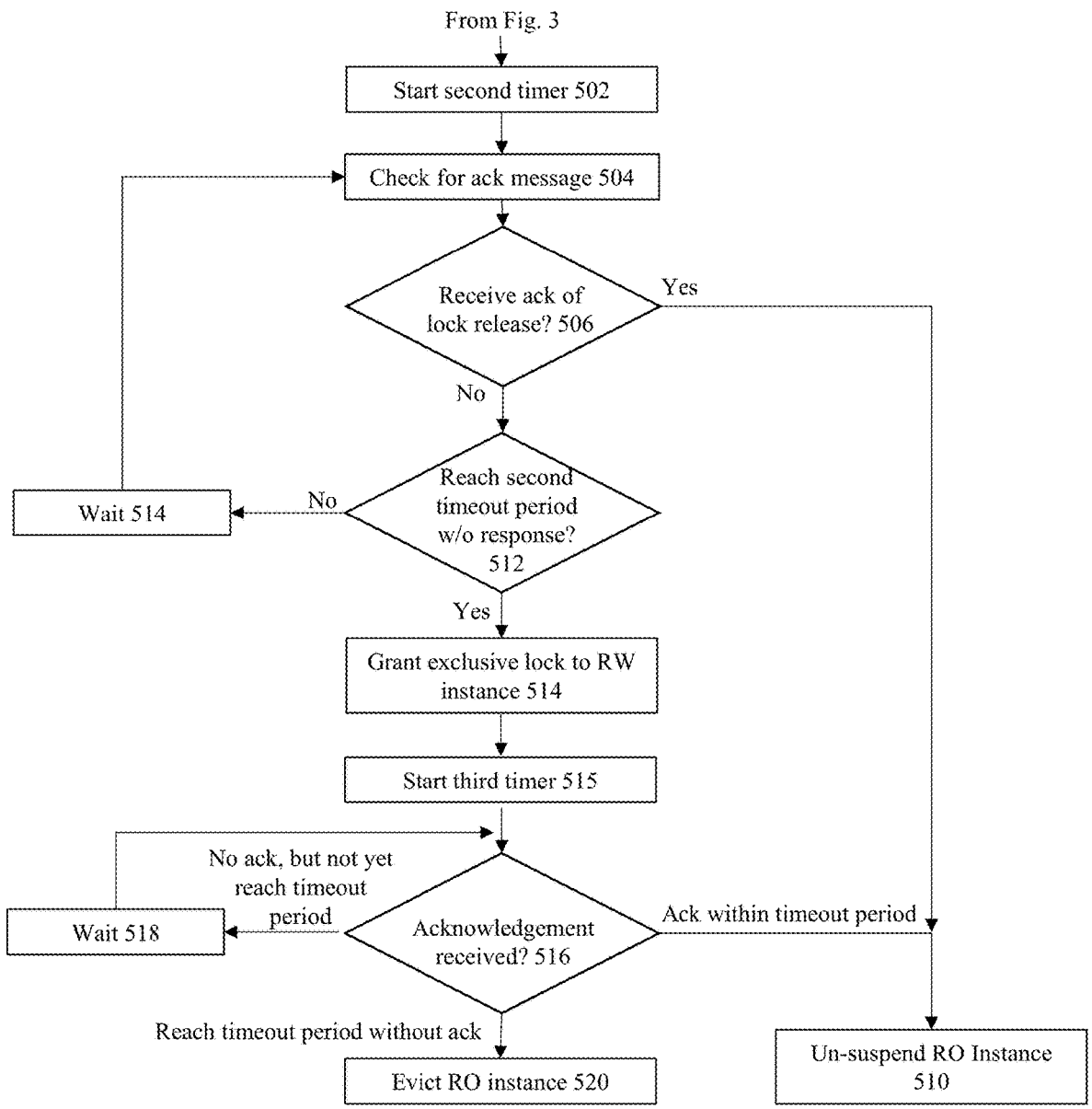
FIG. 5 shows a more detailed flowchart that follows from the flow of FIG. 3, and shows an approach to implement the second and third timeout periods according to some embodiments.

FIG. 5 shows a more detailed flowchart that follows from the flow of FIG. 3, and shows an approach to implement the second and third timeout periods according to some embodiments. At 502, a timer is started for the second timeout period. The timer is tracked for each of the read-only instances that have been placed into a suspend state and for which an entry has been placed into the suspend map. A check is made at step 504 for the acknowledgement message from the suspended instance for the requested lock release.

A determination is made at 506 whether the required acknowledgment message has been received from the suspended instance within the timeout period. If so, then at 510, the suspended instance is un-suspended. This means that the instance can now begin receiving new requests at this point.

If at 506 it was determined that the required acknowledgment message has not been received from the suspended instance, then a further determination is made at 512 whether the threshold of the second timeout period has been reached. If not, then after a wait period at 514, the check for the lock release acknowledgment message is made again.

If the determination is made at 512 that the expiration of the second timeout period has been reached, then at step 514, the exclusive lock is now granted to the RW instance. At this point, the RW instance is permitted to perform the requested write operations upon the specified resource. In some embodiments, if there are multiple nonresponsive instances, then the exclusive lock is granted only after all of the nonresponsive instances have either acknowledged or been suspended (so that the exclusive lock is granted only if there are no longer any non-responsive instances that remain in an un-suspended state).

At step 515, the third timer is started. At 516, a determination is made whether the third, longer timeout period has been reached without the required lock release acknowledgment from the suspended instance. If the appropriate acknowledgment has been received from the suspended instance within the timeout period, then at 510, the instance is un-suspended. If the appropriate acknowledgment has not been received but the timeout period has not yet expired, then after a wait period at 518, this check is made again. If the determination is made at 516 that the threshold of the third timeout period has been reached without the required acknowledgment, then at step 520, the suspended instance is now evicted.

Figure 6A:
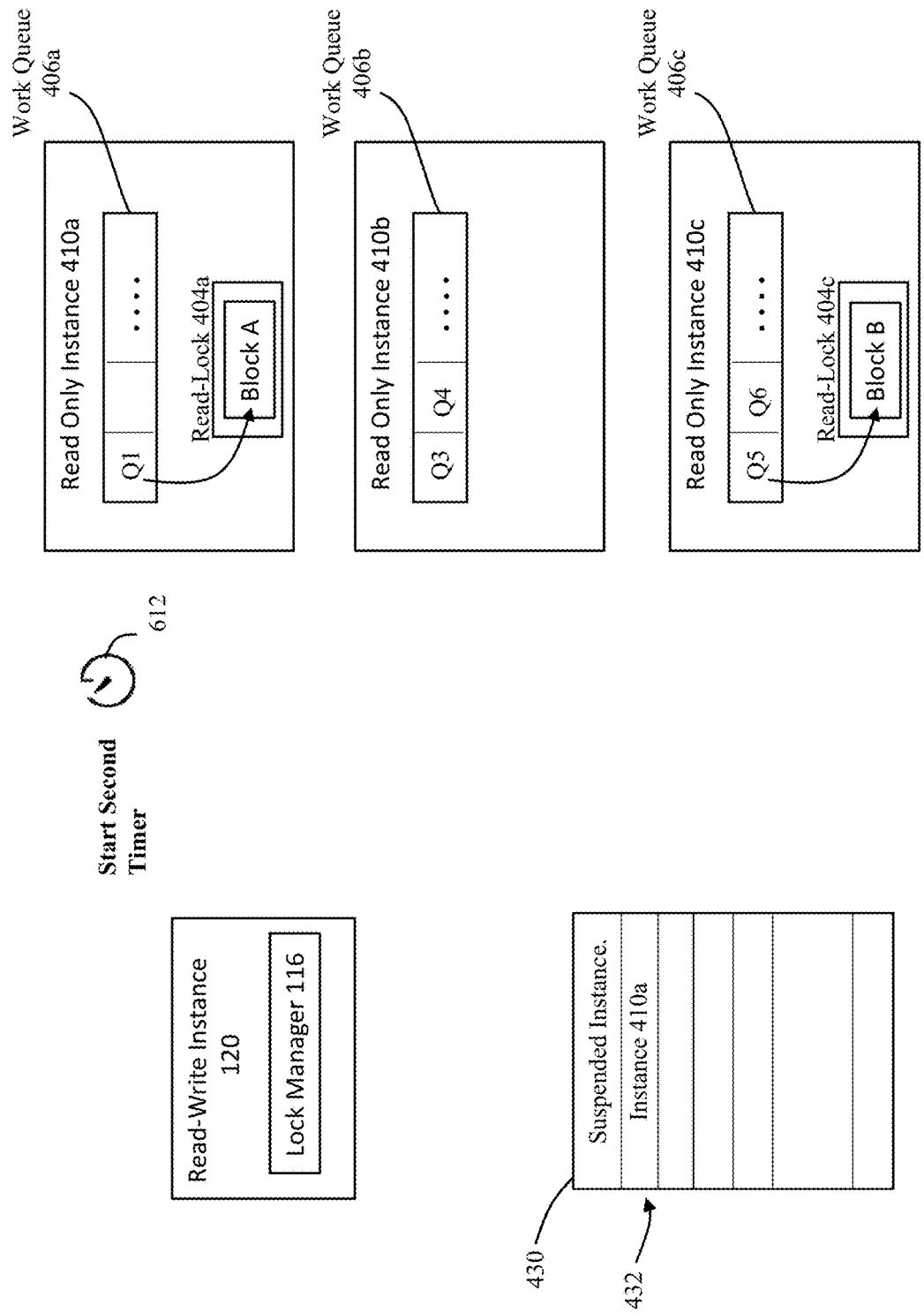
FIGS. 6A-6F illustrate to implement the second and third timeout periods according to some embodiments.

FIGS. 6A-F illustrate a scenario for the application of this process. FIG. 6A shows the previous situation where RO instance 410*a* has already been suspended and an entry 432 has been placed into the suspend map 430 identifying this instance as being suspended. A second timer 612 is started to begin the second timeout period.

Figure 6B:
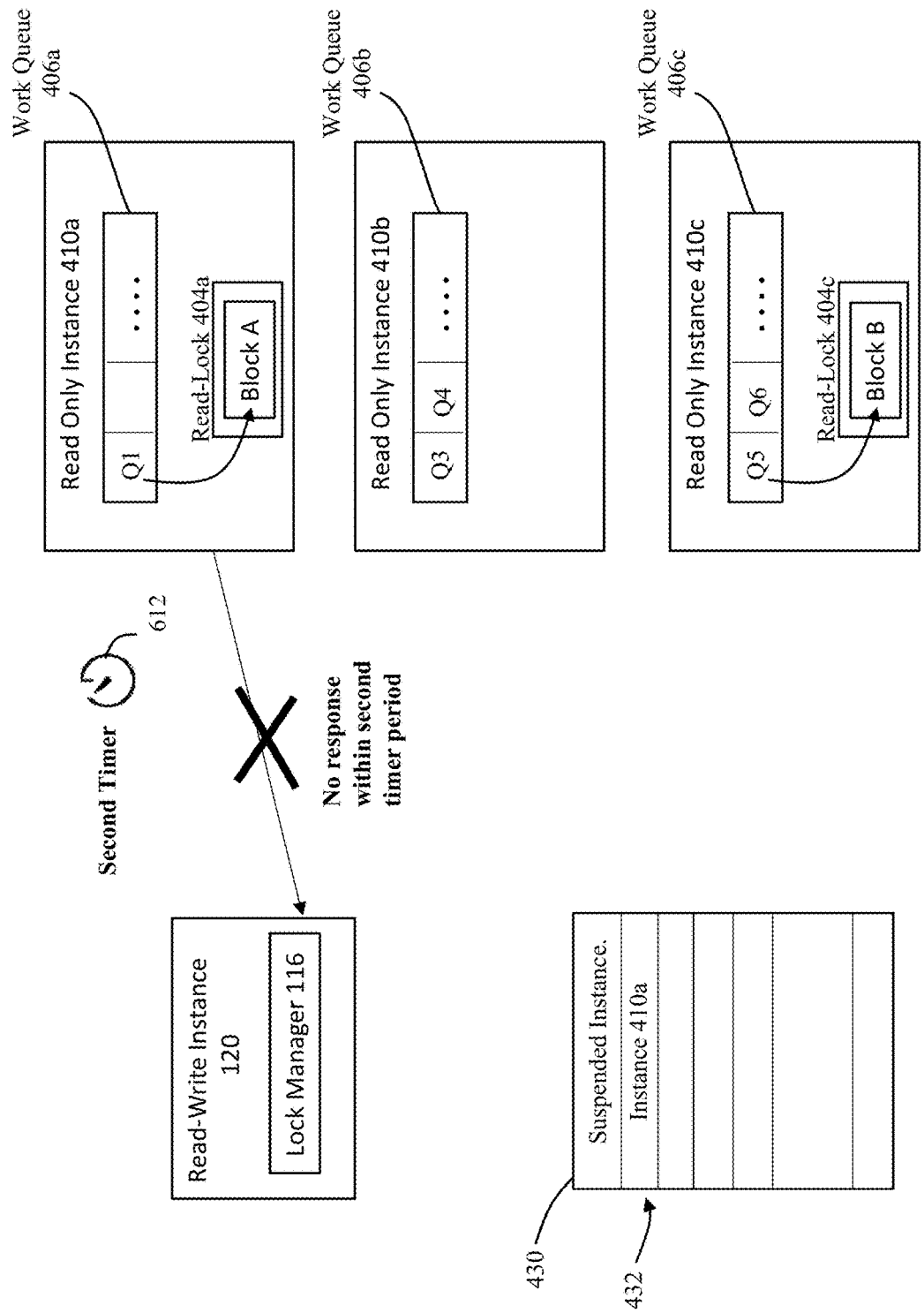
Figure 6C:
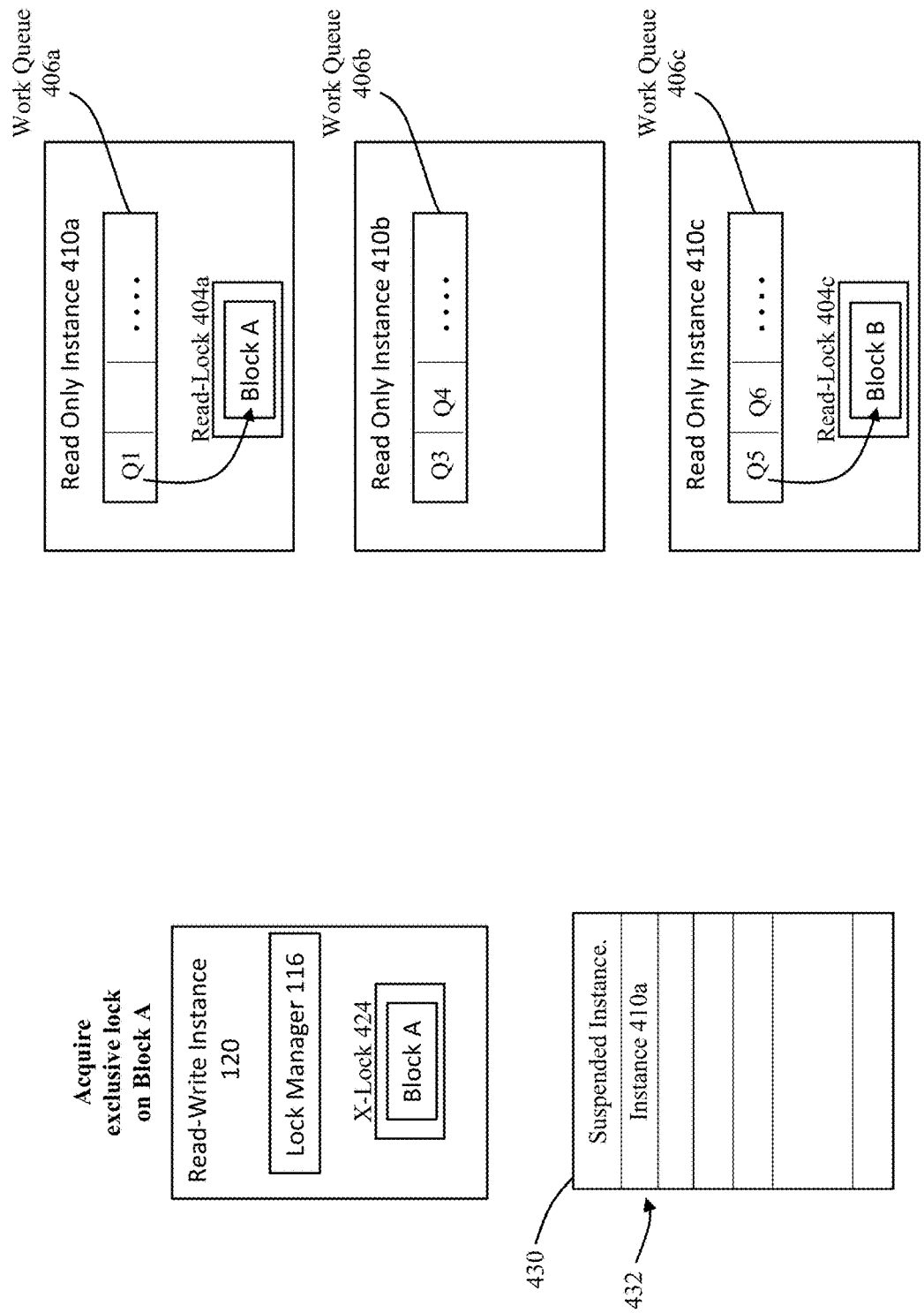

As shown in FIG. 6B, assume that the required acknowledgement message has not been received within the second timeout period from RO instance 410*a* for release of lock 404*a*. As such, as shown in FIG. 6C, the RW instance 120 can now grant itself an exclusive lock 424 on the requested resource (Block A). At this point, the requested write operation can proceed for execution by the RW instance 120.

Figure 6D:
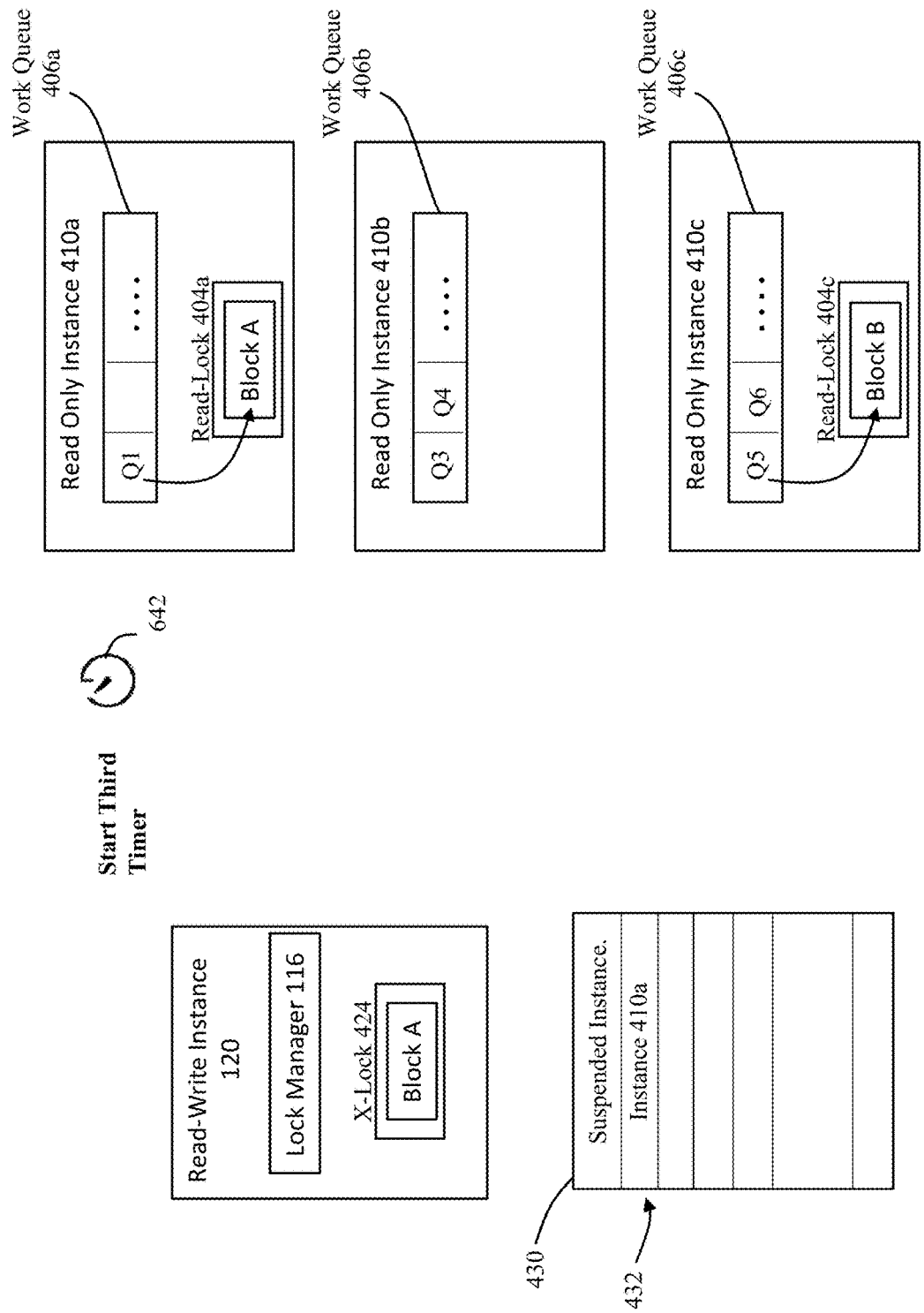
Figure 6E:
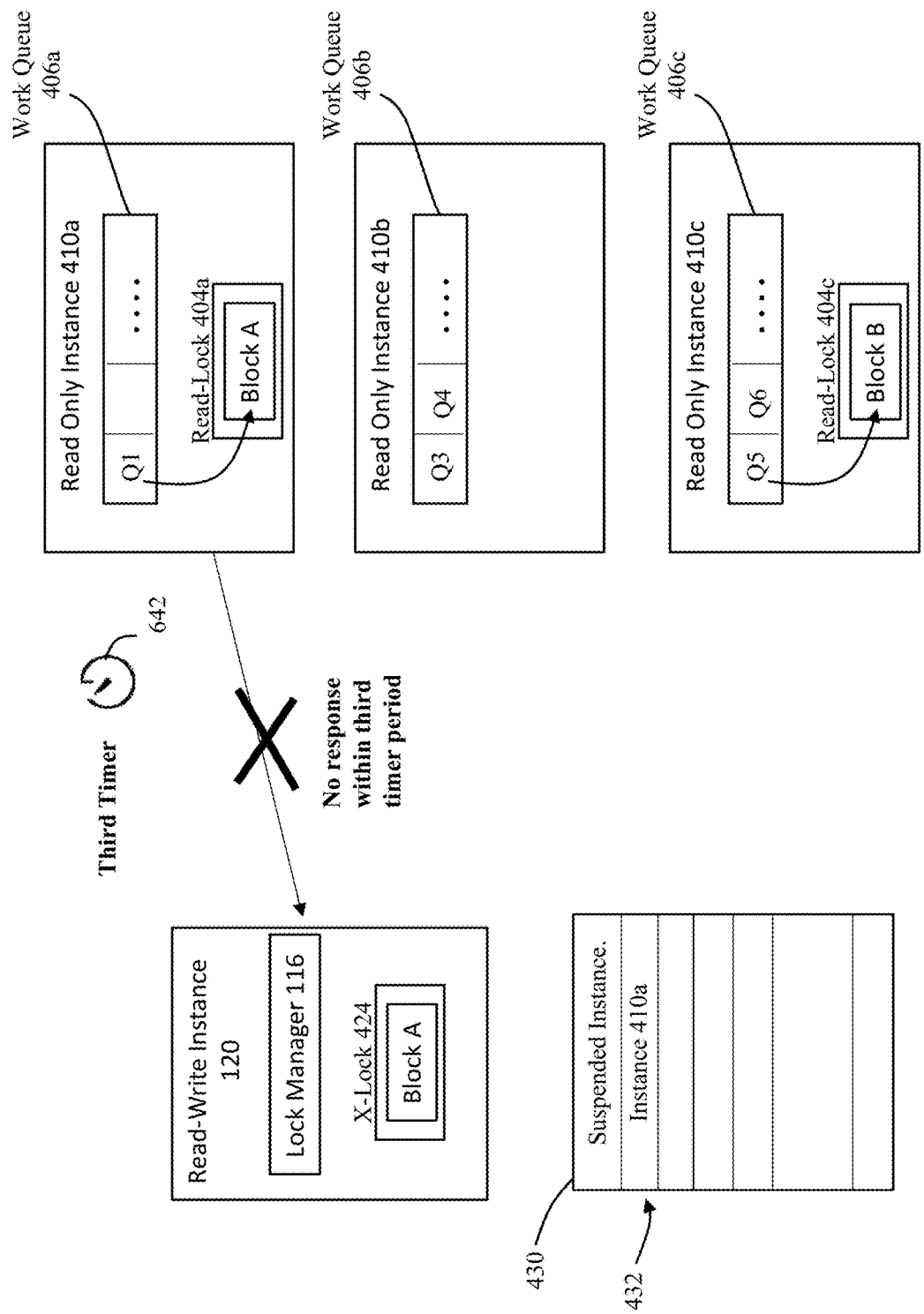
Figure 6F:
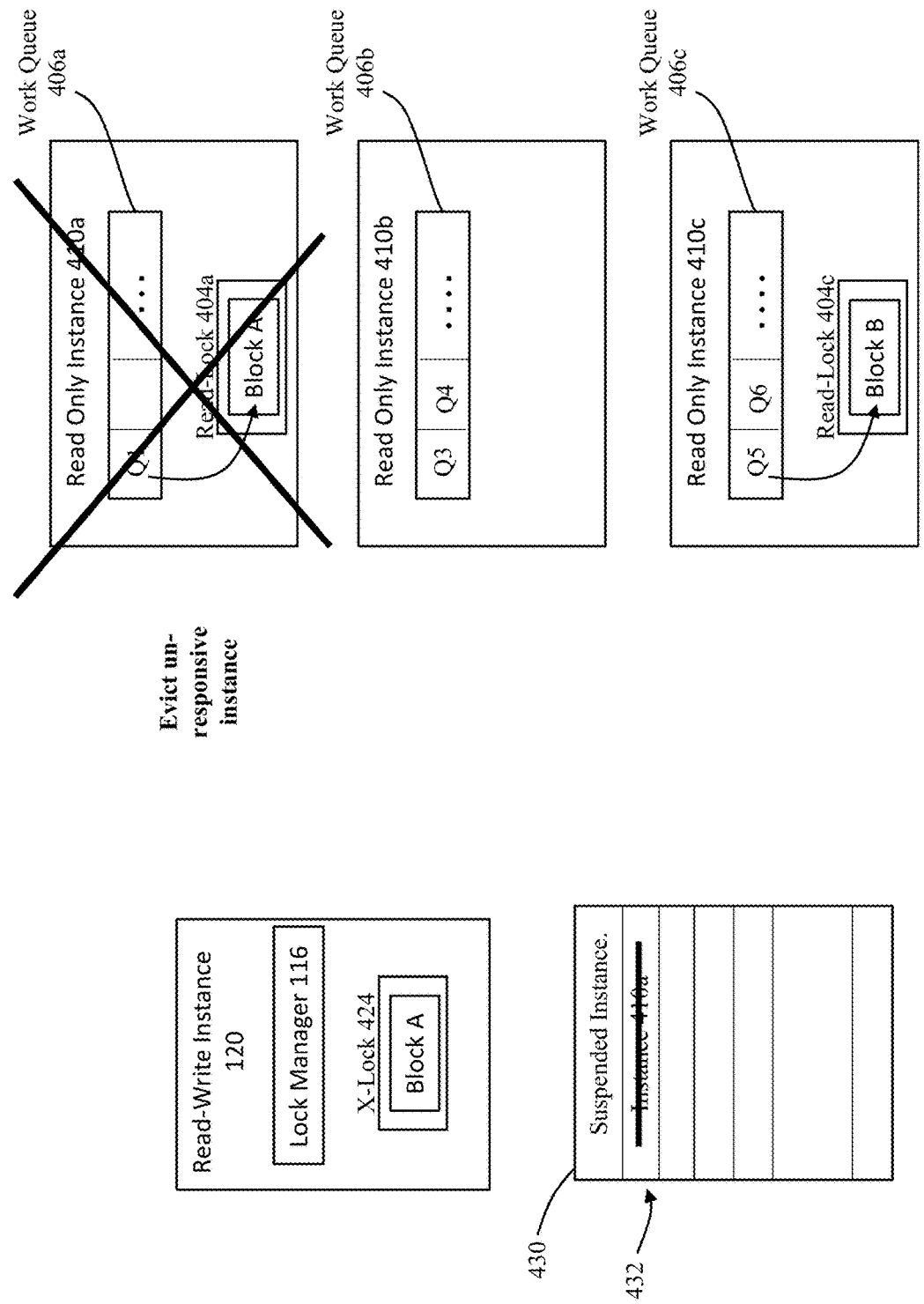

FIG. 6D shows that a third timer 642 is started to begin the third timeout period. This is a longer timeout period, e.g., on a scale of minutes as opposed to the scale of milliseconds of the first and second timeout periods. As shown in FIG. 6E, assume that the required acknowledgement message has not been received within the third timeout period from RO instance 410*a*. As such, as shown in FIG. 6F, the cluster will now perform eviction of the non-responsive RO instance 410*a*.

Figure 7A:
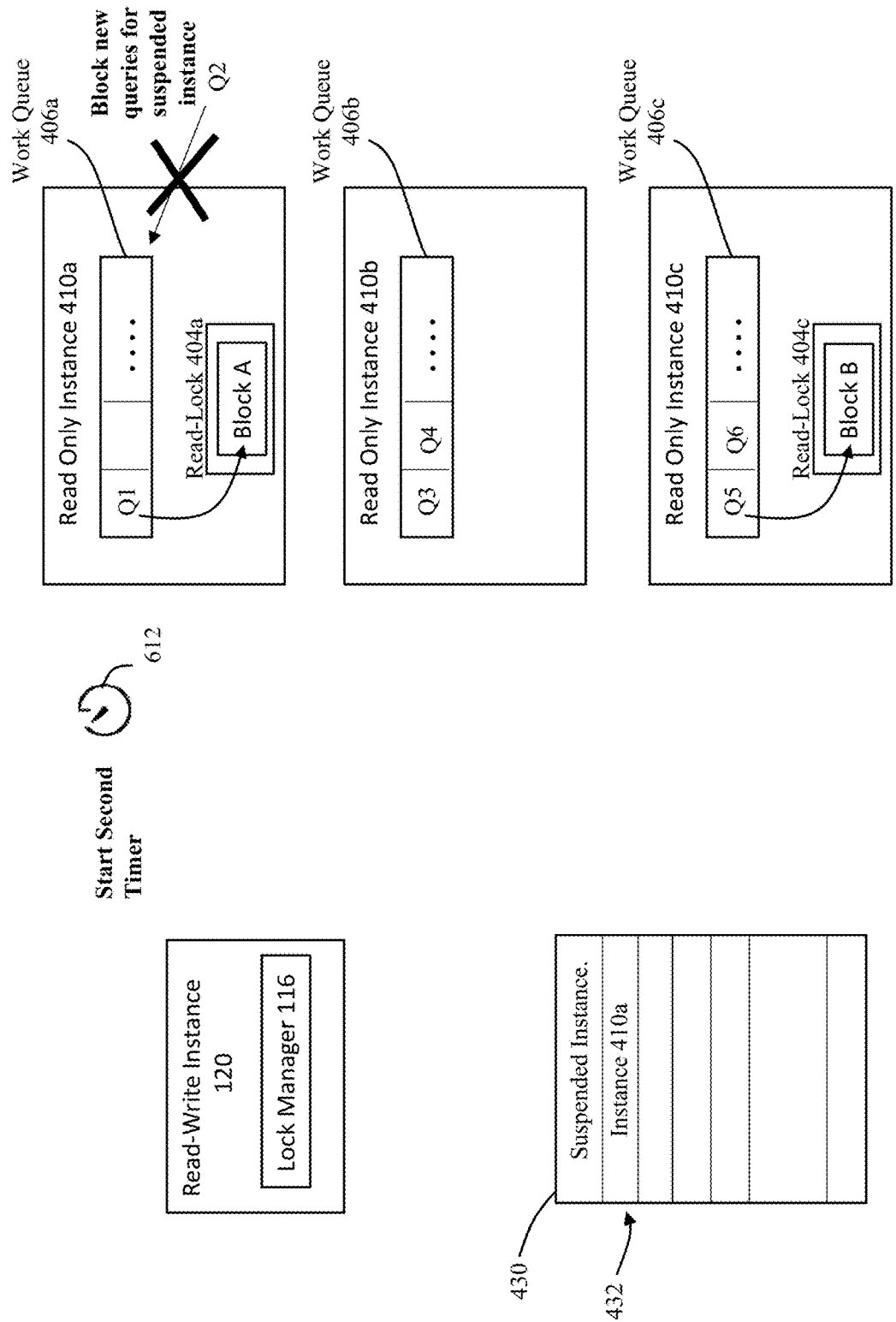
FIGS. 7A-7E show an alternate scenario where a suspended instance does provide an acknowledgment message.

FIGS. 7A-E show an alternate scenario where a suspended instance does provide an acknowledgment message. As before, FIG. 7A shows the previous situation where RO instance 410*a* has already been suspended and an entry 432 has been placed into the suspend map 430 identifying this instance as being suspended. Since RO instance 410*a* is currently suspended, it is not permitted to accept new queries for processing. A second timer 612 is started to begin the second timeout period.

Figure 7B:
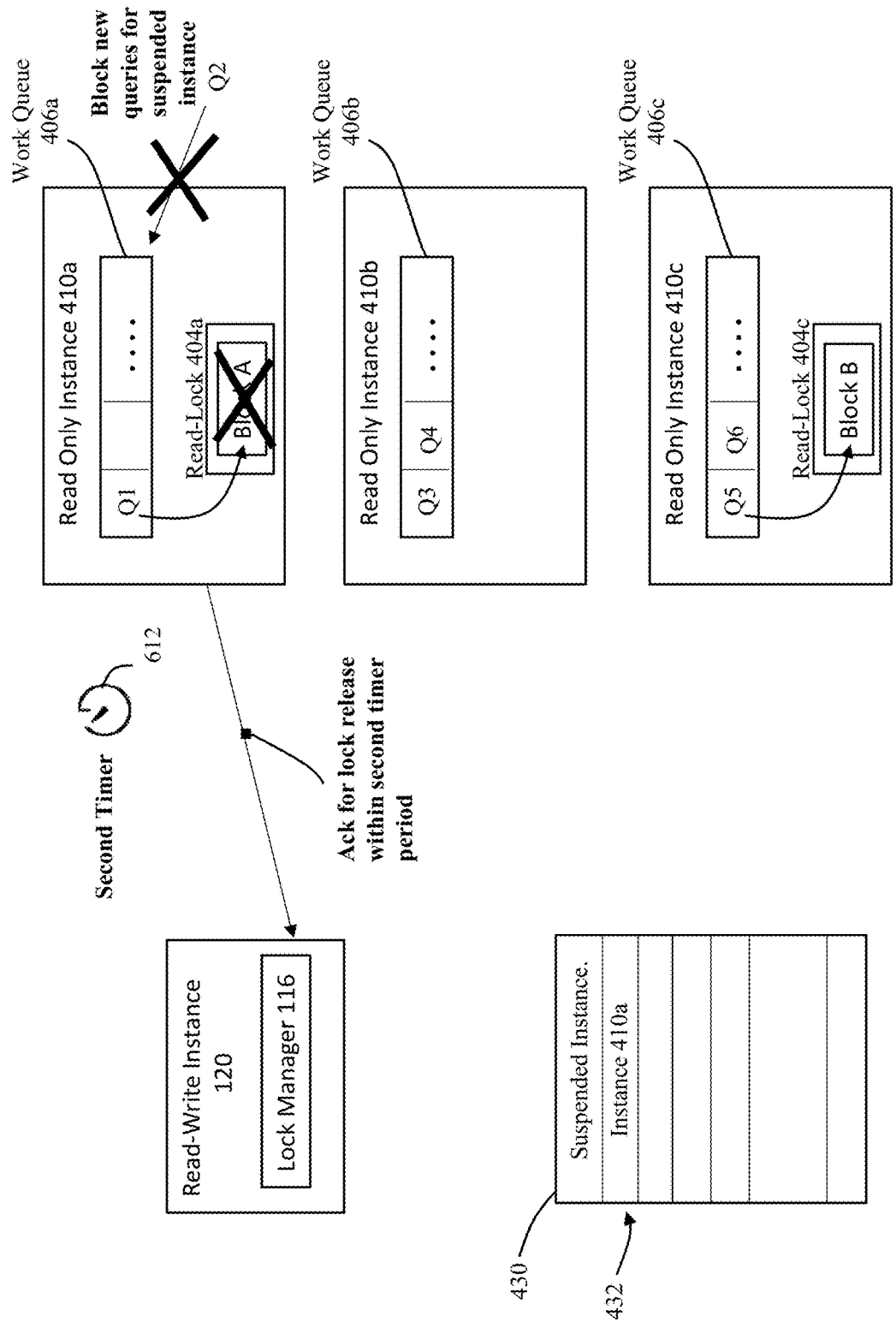

However, unlike the scenario of FIGS. 6A-F where the suspended instance fails to provide an acknowledgement, FIG. 7B shows a different outcome where an acknowledgment is provided within the second timeout period. What this means is that during the suspension period for the RO instance 410*a*, this instance has released lock 404*a* and has sent acknowledgement of the invalidation of this lock back to the RW instance 120.

Figure 7C:
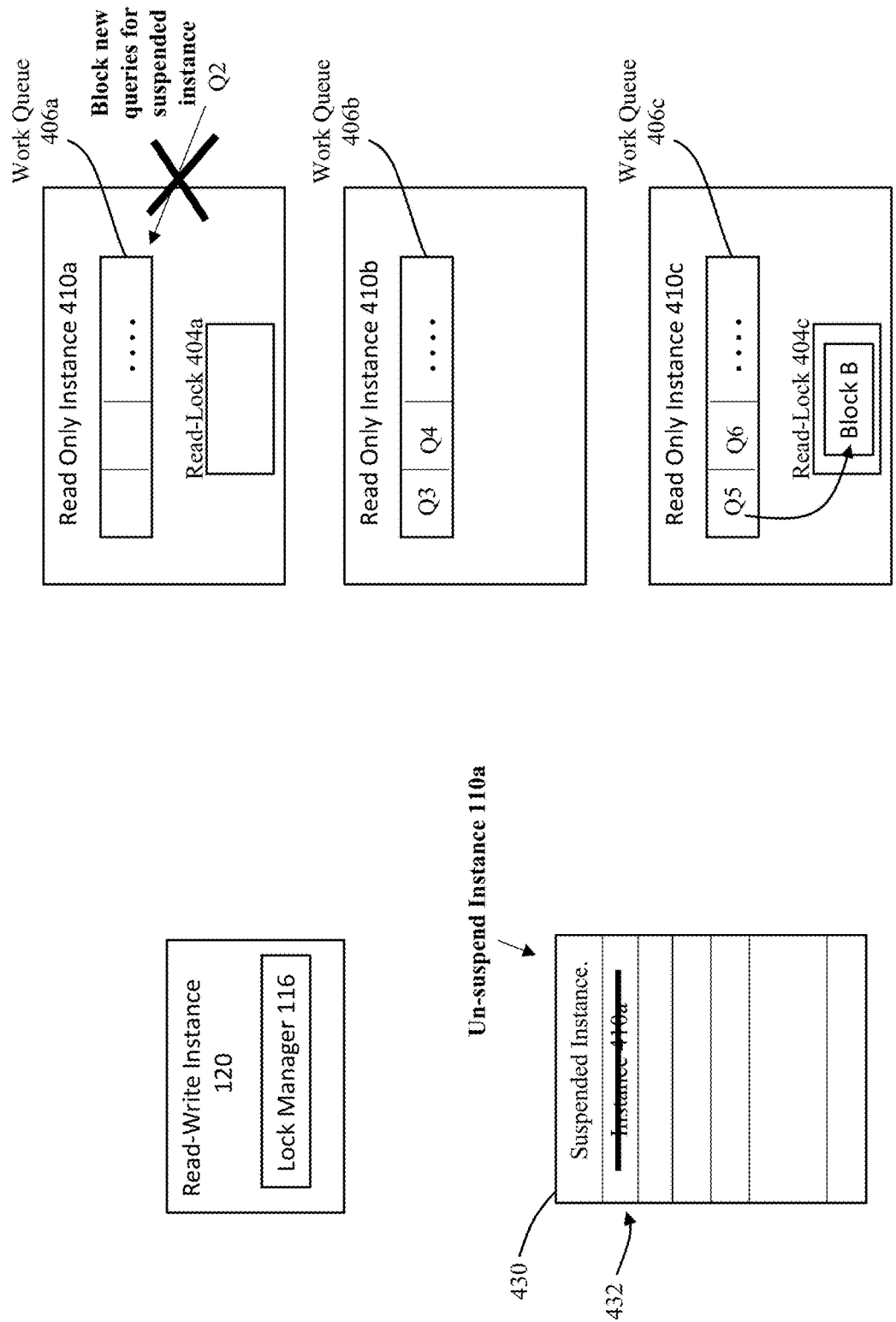
Figure 7D:
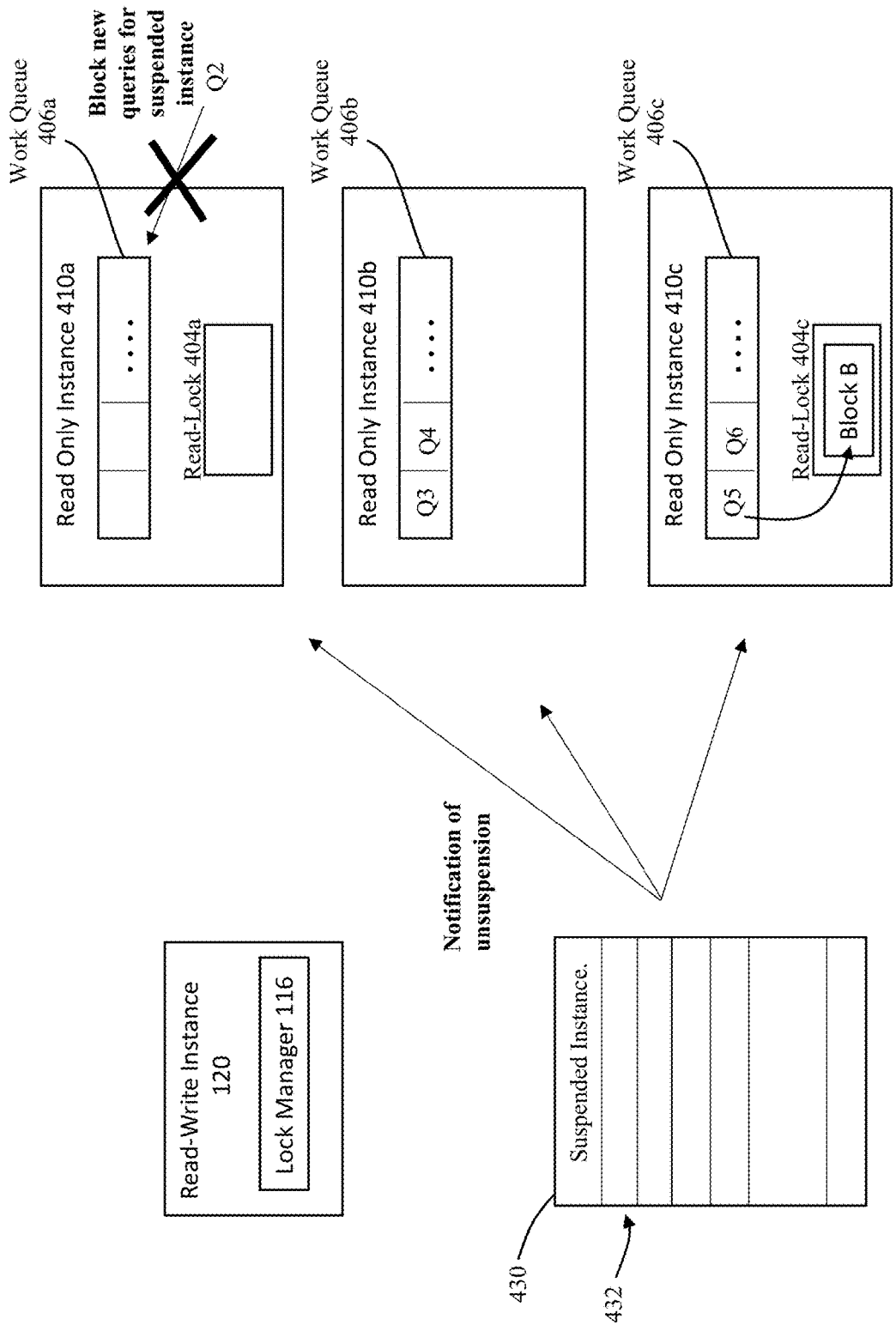
Figure 7E:
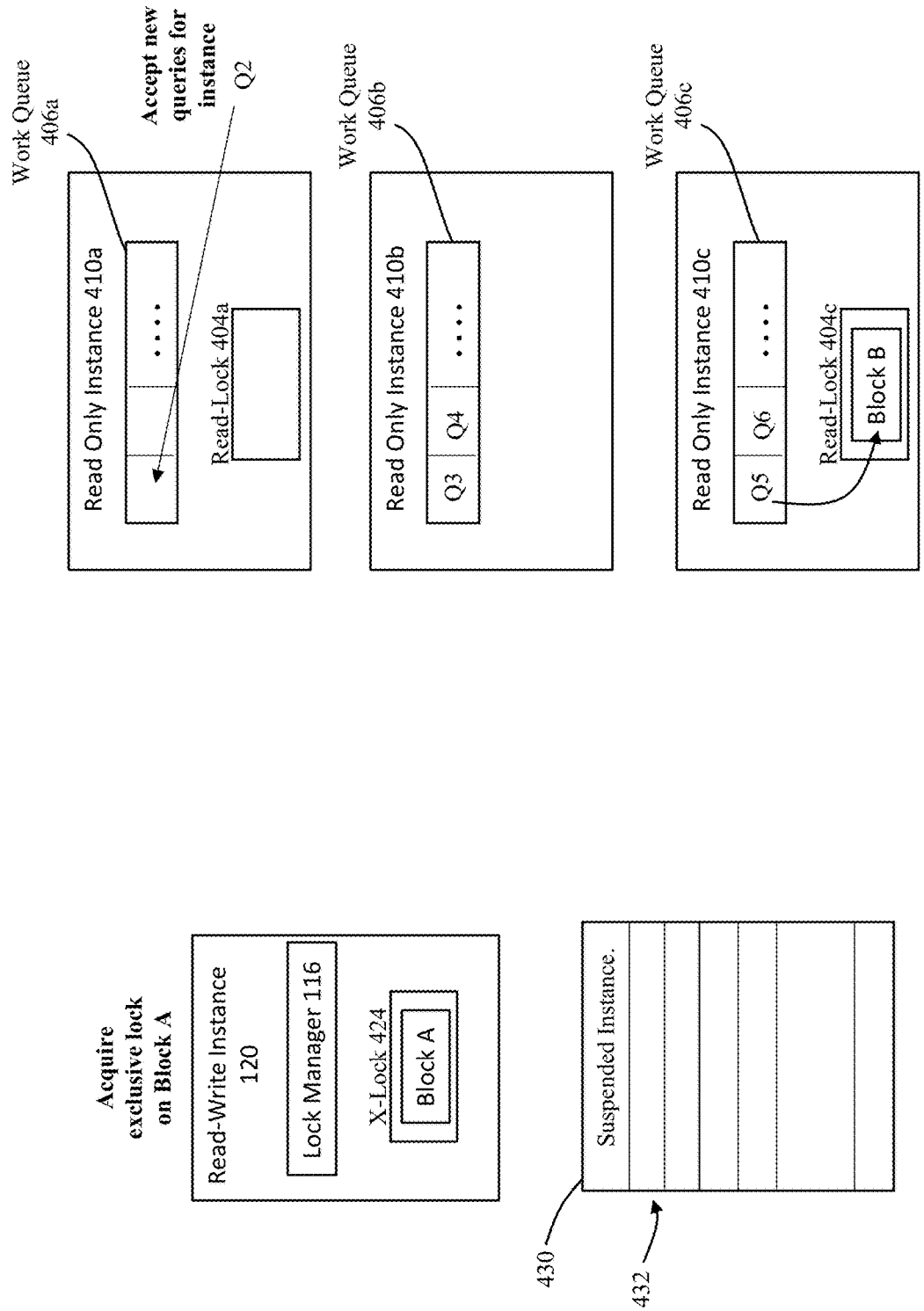

As a result, as shown FIG. 7C, the previously suspended instance 410*a* is now un-suspended. The entry 432 for this instance in suspend map 430 is removed. As shown in FIG. 7D, notification can be provided to the instances within the cluster of the un-suspension of RO instance 410*a*. Thereafter, the formerly-suspended instance can now begin accepting new queries for processing again. As shown in FIG. 7E, a new query Q2 can now be placed into work queue 406*a* and accepted for processing by RO instance 410*a*.

Therefore, what has been described is an improved approach to handle unresponsive reader instances in a database system, where a timeout-based invalidation and suspension approach is provided that addresses the problem of unresponsive read-only instances. Multiple time-out periods are established, with escalating actions taken at each of the different timeout periods. This approach is therefore able to address a read-only instance that fails to acknowledge invalidation in a quick and efficient manner, where an intermediate action is taken to temporarily suspend the unresponsive instance and to allow the writer instance access to the required lock. Any escalation to harsher actions such as eviction occurs only after later timeout periods have expired.

System Architecture Overview

Figure 8:
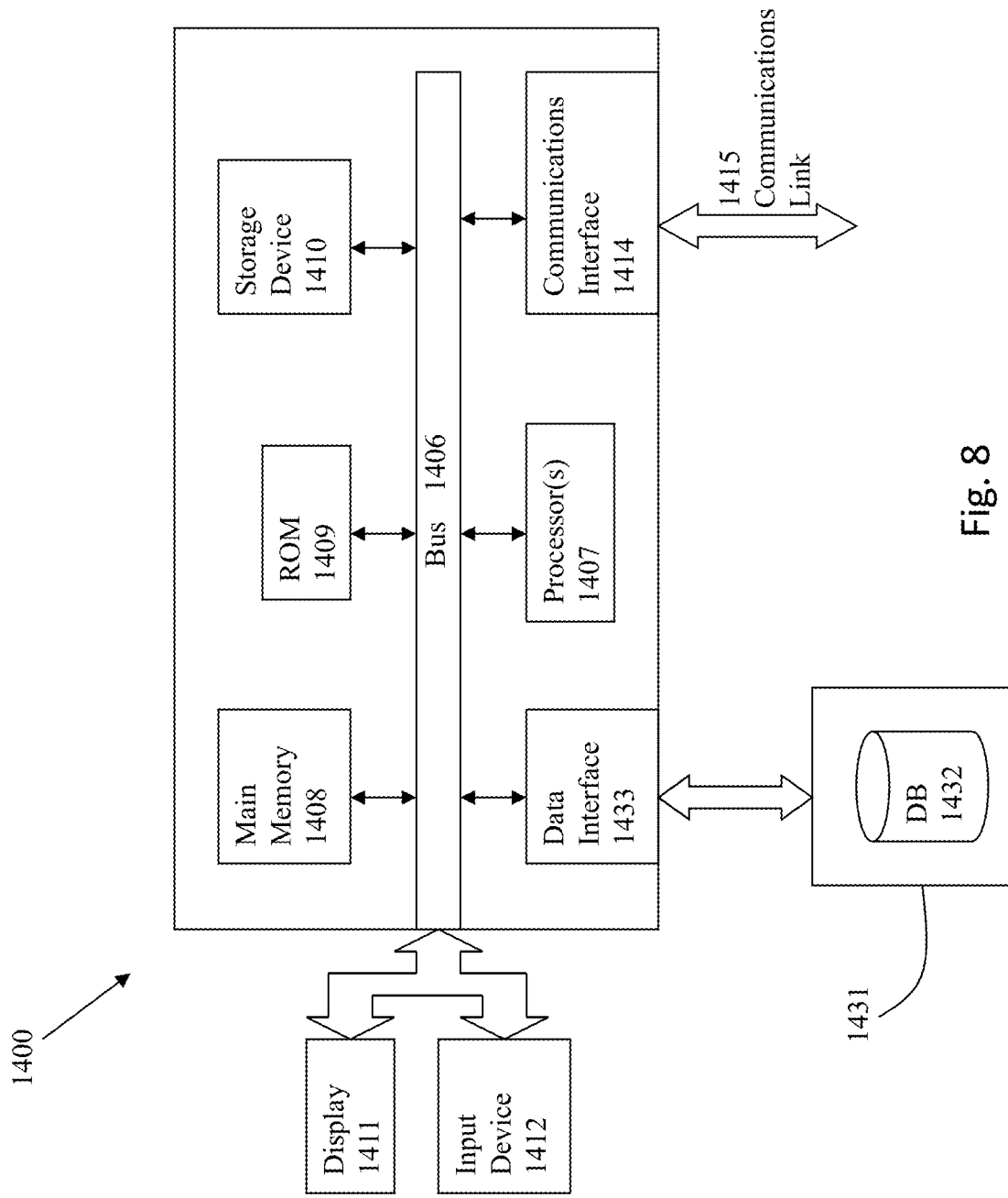
FIG. 8 is a block diagram of an illustrative computing system suitable for implementing an embodiment of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 9:
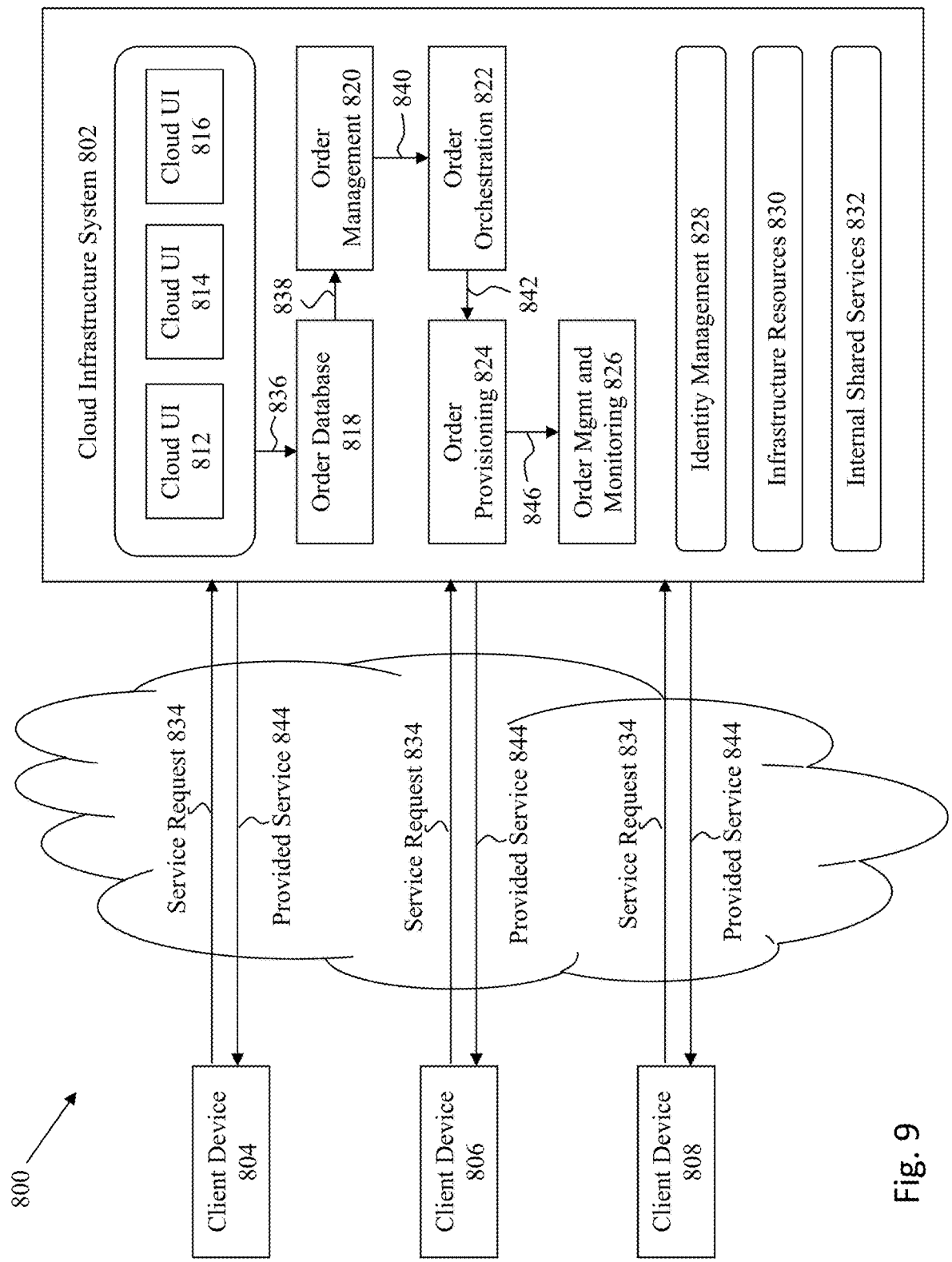
FIG. 9 is a block diagram of one or more components of a system environment in which services may be offered as cloud services, in accordance with an embodiment of the present invention.

FIG. 9 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 8. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method for managing read-only instances in a clustered database system, comprising:
    maintaining a clustered database system having a plurality of read-only instances and at least one read-write instance, the clustered database system having a shared database that is accessible by any of the at least one read-write instance and the plurality of read-only instances;
    receiving a write request at the at least one read-write instance to write to a resource within the shared database;
    instructing one or more of the plurality of read-only instances to release a first lock on the resource; and
    implementing multiple timer periods to manage any of the one or more of the plurality of read-only instances that do not provide an acknowledgment of release for the first lock on the resource, the multiple timer periods includes a first timer period and a second timer period, wherein expiration of the first timer period corresponds to a suspend state imposed on an unresponsive read-only instance, and expiration of the second timer period corresponds to a grant of a second lock on the resource to the at least one read-write instance.

2. The method of claim 1, wherein the suspend state is imposed by adding an entry for the unresponsive read-only instance to a suspend map.

3. The method of claim 2, further comprising a cluster manager component that communicates with instances within the clustered database system to provide notification of suspension of the unresponsive read-only instance.

4. The method of claim 1, wherein the unresponsive read-only instance while in the suspend state, finishes a pending query but is unable to begin a new query.

5. The method of claim 1, further comprising a third timer period, wherein the third timer period is longer than the first and second timer periods.

6. The method of claim 1, further comprising un-suspending the unresponsive read only instance after providing the acknowledgment of release for the first lock on the resource.

7. The method of claim 1, wherein the first lock held by the one or more of the plurality of read-only instances corresponds to a shared read lock, the second lock on the resource to the at least one read-write instance corresponds to an exclusive lock, and the first and second locks are managed by a distributed lock manager.

8. The method of claim 1, wherein the multiple timer periods include a third timer period, and expiration of the third timer period corresponds to an eviction of the unresponsive read-only instance from the clustered database system.

9. A non-transitory computer program product embodied on a computer readable medium, the computer readable medium having stored thereon a sequence of instructions which, when executed by a processor, executes a set of acts for managing read-only instances in a clustered database system, comprising:
    maintaining a clustered database system having a plurality of read-only instances and at least one read-write instance, the clustered database system having a shared database that is accessible by any of the at least one read-write instance and the plurality of read-only instances;

receiving a write request at the at least one read-write instance to write to a resource within the shared database;

instructing one or more of the plurality of read-only instances to release a first lock on the resource; and implementing multiple timer periods to manage any of the one or more of the plurality of read-only instances that do not provide an acknowledgment of release for the first lock on the resource, the multiple timer periods includes a first timer period, a second timer period, and a third timer period, wherein expiration of the first timer period corresponds to a suspend state imposed on an unresponsive read-only instance, expiration of the second timer period corresponds to a grant of a second lock on the resource to the at least one read-write instance, and expiration of the third timer period corresponds to an eviction of the unresponsive read-only instance from the clustered database system.

10. The non-transitory computer program product of claim 9, wherein the suspend state is imposed by adding an entry for the unresponsive read-only instance to a suspend map.

11. The non-transitory computer program product of claim 10, wherein the set of acts further comprise a cluster manager component that communicates with instances within the clustered database system to provide notification of suspension of the unresponsive read-only instance.

12. The non-transitory computer program product of claim 9, wherein the unresponsive read-only instance, while in the suspend state, finishes a pending query but is unable to begin a new query.

13. The non-transitory computer program product of claim 9, wherein the third timer period is longer than the first and second timer periods.

14. The non-transitory computer program product of claim 9, wherein the set of acts further comprise un-suspending the unresponsive read only instance after providing the acknowledgment of release for the first lock on the resource.

15. The non-transitory computer program product of claim 9, wherein the first lock held by the one or more of the plurality of read-only instances corresponds to a shared read lock, the second lock on the resource to the at least one read-write instance corresponds to an exclusive lock, and the first and second locks are managed by a distributed lock manager.

16. The non-transitory computer program product of claim 9, wherein the multiple timer periods include a third timer period, and expiration of the third timer period corresponds to an eviction of the unresponsive read-only instance from the clustered database system.

17. A clustered database system, comprising: a plurality of read-only instances on respective hardware servers of a plurality of hardware servers; at least one read-write instance on a hardware server of the plurality of hardware servers; and a shared database on a plurality of storage devices comprising a storage pool, where the shared database on the plurality of storage devices comprising the storage pool is accessible by any of the at least one read-write instance and the plurality of read-only instances, wherein the clustered database system includes a set of instructions executable by a processor to implement receiving a write request at the at least one read-write instance to write to a resource within the shared database; instructing one or more of the plurality of read-only instances to release a first lock on the resource; and implementing multiple timer periods to manage any of the one or more of the plurality of read-only instances that do not provide an acknowledgment of release for the first lock on the resource, the multiple timer periods includes a first timer period, a second timer period, and a third timer period, wherein expiration of the first timer period corresponds to a suspend state imposed on an unresponsive read-only instance, expiration of the second timer period corresponds to a grant of a second lock on the resource to the at least one read-write instance, and expiration of the third timer period corresponds to an eviction of the unresponsive read-only instance from the clustered database system.

18. The clustered database system of claim 17, wherein the suspend state is imposed by adding an entry for the unresponsive read-only instance to a suspend map.

19. The clustered database system of claim 18, wherein the set of instructions executable by the processor to further implement a cluster manager component that communicates with instances within the clustered database system to provide notification of suspension of the unresponsive read-only instance.

20. The clustered database system of claim 17, wherein the unresponsive read-only instance, while in the suspend state, finishes a pending query but is unable to begin a new query.

21. The clustered database system of claim 17, wherein the third timer period is longer than the first and second timer periods.

22. The clustered database system of claim 17, wherein the set of instructions executable by a processor to further implement un-suspending the unresponsive read only instance after providing the acknowledgment of release for the first lock on the resource.

23. The clustered database system of claim 17, wherein the first lock held by the one or more of the plurality of read-only instances corresponds to a shared read lock, the second lock on the resource to the at least one read-write instance corresponds to an exclusive lock, and the first and second locks are managed by a distributed lock manager.

24. The clustered database system of claim 17, wherein the multiple timer periods include a third timer period, and expiration of the third timer period corresponds to an eviction of the unresponsive read-only instance from the clustered database system.

* * * * *